US012764155B1

(12) United States Patent
Luttwak et al.

(10) Patent No.: US 12,764,155 B1
(45) Date of Patent: Oct. 13, 2026

(54) TECHNIQUES FOR FUZZY MATCHING FOR REDUCING CYBERSECURITY ALERT NOISE IN CLOUD ENVIRONMENTS

(71) Applicant: Wiz, Inc., New York, NY (US)

(72) Inventors: Ami Luttwak, Binyamina (IL); Michael Aminov, Givatayim (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/554,840

(22) Filed: Mar. 3, 2026

(51) Int. Cl.
*H04L 9/40* (2022.01)
*G06F 16/2458* (2019.01)

(52) U.S. Cl.
CPC ...... *H04L 63/1441* (2013.01); *G06F 16/2468* (2019.01); *H04L 63/1416* (2013.01)

(58) Field of Classification Search
CPC ............. H04L 63/1441; H04L 63/1416; G06F 16/2468
See application file for complete search history.

(56) References Cited

U.S. PATENT DOCUMENTS 8,990,223 B2 * 3/2015 Melnychenko ... G06F 16/24578 707/758
10,873,596 B1 12/2020 Bourget et al.
11,494,285 B1 11/2022 Manthey et al.
11,573,887 B2 2/2023 Menashe et al.
12,580,934 B1 3/2026 Adamson et al.
12,591,581 B2 * 3/2026 Wen .................. G06F 16/24575
2010/0106724 A1 * 4/2010 Anderson .............. G06N 20/00 707/E17.046
2013/0151561 A1 * 6/2013 Pfeifle ................... G06F 16/322 707/769
2013/0228619 A1 * 9/2013 Soborski .............. G07D 7/0043 235/462.25
2017/0171231 A1 6/2017 Reybok, Jr. et al.
2018/0137179 A1 * 5/2018 Kawanabe .......... G06F 16/2468
2018/0329962 A1 * 11/2018 Schrijen ................ H04L 9/3278
2019/0190945 A1 6/2019 Jang et al.
(Continued)

FOREIGN PATENT DOCUMENTS

CN 101464896 B * 8/2010
CN 105208746 A * 12/2015
(Continued)

*Primary Examiner* — John B King
(74) *Attorney, Agent, or Firm* — M&B IP Analysts, LLC

(57) ABSTRACT

A system and method for noise reduction for cybersecurity alerts in a cloud computing environment is presented. The method includes receiving a plurality of cloud alerts, wherein each cloud alert in the plurality of cloud alerts includes an identifier of a cloud entity; initiating a fuzzy search based on the identifier of the cloud entity and a plurality of code objects stored in a code repository of the cloud computing environment; determining, based on a result of the fuzzy search, a probability that a code object of the plurality of code objects is associated with the cloud alert; removing the cloud alert from the cybersecurity monitoring system in response to determining that the probability exceeds a first predetermined threshold; and initiating a mitigation action in the cloud computing environment based on the cloud alert in response to determining that the probability is below a second predetermined threshold.

19 Claims, 4 Drawing Sheets

(56) References Cited

U.S. PATENT DOCUMENTS

| | | | | |
|---|---|---|---|---|
| 2020/0125563 | A1* | 4/2020 | Fan | H04L 9/0894 |
| 2021/0090694 | A1* | 3/2021 | Colley | G16H 50/50 |
| 2021/0126938 | A1 | 4/2021 | Trost et al. | |
| 2021/0193143 | A1* | 6/2021 | Zhou | G10L 25/51 |
| 2022/0164277 | A1 | 5/2022 | Menashe et al. | |
| 2023/0095870 | A1 | 3/2023 | Du | |
| 2023/0319086 | A1 | 10/2023 | Beauchesne et al. | |
| 2023/0401274 | A1* | 12/2023 | Denninghoff | G06F 16/9577 |
| 2024/0291869 | A1 | 8/2024 | Crabtree et al. | |
| 2025/0321859 | A1 | 10/2025 | Evans | |
| 2025/0328784 | A1 | 10/2025 | Caulfield | |
| 2025/0343819 | A1 | 11/2025 | Weber et al. | |
| 2026/0134958 | A1* | 5/2026 | Colley | G16H 10/60 |

FOREIGN PATENT DOCUMENTS

| | | | | | |
|---|---|---|---|---|---|
| CN | 106048983 | A | * | 10/2016 | D06F 34/18 |
| CN | 106453691 | A | * | 2/2017 | G06F 16/245 |
| CN | 106528629 | A | * | 3/2017 | G06F 16/2468 |
| CN | 111563139 | A | * | 8/2020 | G06F 16/328 |
| CN | 112541019 | A | * | 3/2021 | G06F 16/24578 |
| CN | 118606376 | A | * | 9/2024 | G06F 21/602 |

* cited by examiner

TECHNIQUES FOR FUZZY MATCHING FOR REDUCING CYBERSECURITY ALERT NOISE IN CLOUD ENVIRONMENTS

TECHNICAL FIELD

The present disclosure relates generally to cybersecurity monitoring in cloud computing environments, and more particularly to techniques for reducing noise in cybersecurity alert streams by correlating cloud alerts with underlying code objects, configuration definitions, and infrastructure artifacts. Certain embodiments described herein involve semantic normalization of alert identifiers, generation of fuzzy search terms, and probabilistic determination of whether an alert originates from internally maintained code or from an external or anomalous source.

BACKGROUND

Modern cloud computing environments generate large volumes of security-related alerts originating from diverse services, workloads, and management interfaces. Many of these alerts correspond to expected internal operations, such as authorized API calls, automated deployments, infrastructure updates, or routine configuration changes, and therefore do not represent actual security threats.

However, traditional monitoring systems lack sufficient context to distinguish benign, code-generated events from suspicious activity. As a result, analysts are frequently overwhelmed by high false-positive rates and must manually triage large numbers of irrelevant alerts. There exists a need for improved techniques that reduce alert noise by automatically determining whether a cloud alert corresponds to an internally defined code object or to potentially malicious external behavior.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that, in operation, causes or cause the system to perform the actions. One or more computer programs can be configured to perform particular operations or actions by virtue of including instructions that, when executed by data processing apparatus, cause the apparatus to perform the actions.

In one general aspect, the method may include receiving a plurality of cloud alerts, where each cloud alert in the plurality of cloud alerts includes an identifier of a cloud entity. The method may also include initiating a fuzzy search based on the identifier of the cloud entity and a plurality of code objects stored in a code repository of the cloud computing environment; determining, based on a result of the fuzzy search, a probability that a code object of the plurality of code objects is associated with the cloud alert; removing the cloud alert from the cybersecurity monitoring system in response to determining that the probability exceeds a first predetermined threshold; initiating a mitigation action in the cloud computing environment based on the cloud alert in response to determining that the probability is below a second predetermined threshold. Other embodiments of this aspect include corresponding computer systems, apparatus, and computer programs recorded on one or more computer storage devices, each configured to perform the actions of the methods.

Implementations may include one or more of the following features. The method may include extracting alert terms from the plurality of cloud alerts; and normalizing the alert terms, where normalizing the alert includes tokenizing the identifier of the cloud entity; generating a frequency-based analysis to determine an uniqueness score for each normalized alert term; adjusting a weight of the alert term based on the uniqueness score of the normalized alert term; training a generative AI model based on a training corpus, a training function and a selected loss function to generate a trained artificial neural network (ANN), where training function includes a backpropagation algorithm and a gradient descent algorithm; inputting the identifier of the cloud entity into the trained generative AI model; receiving fuzzy search terms from the trained generative AI model based on the input; and performing the fuzzy search based on the fuzzy search terms; identifying fuzzy search terms based on an approximate-string-matching; and performing the fuzzy search based on the identified fuzzy search terms; updating the first predetermined threshold based on the mitigation action; and prioritizing the mitigation action based on the probability; recalculating the probability in response to determining the probability is between the first predetermined threshold and second predetermined threshold, where the first predetermined threshold and the second predetermined threshold are different numerical values; retrieving one or more candidate code excerpts associated with a code object from the plurality of code objects; inputting, to a large language model (LLM) model, the one or more candidate code excerpts; and generating, via the LLM, an explanatory-alignment score, where the explanatory-alignment score is a degree of may include between the cloud alert and operations included in the one or more candidate code excerpts. Implementations of the described techniques may include hardware, a method or process, or a computer tangible medium.

In one general aspect, non-transitory computer-readable medium may include one or more instructions that, when executed by one or more processing circuitries of a device, cause the device to receive a plurality of cloud alerts, where each cloud alert in the plurality of cloud alerts includes an identifier of a cloud entity; initiate a fuzzy search based on the identifier of the cloud entity and a plurality of code objects stored in a code repository of the cloud computing environment; determine, based on a result of the fuzzy search, a probability that a code object of the plurality of code objects is associated with the cloud alert; remove the cloud alert from the cybersecurity monitoring system in response to determining that the probability exceeds a first predetermined threshold; initiate a mitigation action in the cloud computing environment based on the cloud alert in response to determining that the probability is below a second predetermined threshold. Other embodiments of this aspect include corresponding computer systems, apparatus, and computer programs recorded on one or more computer storage devices, each configured to perform the actions of the methods.

In one general aspect, the system may include a processing circuitry. The system may also include a memory, the memory containing instructions that, when executed by the processing circuitry, configure the system to receive a plurality of cloud alerts, where each cloud alert in the plurality of cloud alerts includes an identifier of a cloud entity; initiate a fuzzy search based on the identifier of the cloud entity and a plurality of code objects stored in a code repository of the cloud computing environment; determine, based on a result of the fuzzy search, a probability that a code object of the plurality of code objects is associated with the cloud alert; remove the cloud alert from the cybersecurity monitoring system in response to determining that the probability exceeds a first predetermined threshold; initiate a mitigation action in the cloud computing environment based on the cloud alert in response to determining that the probability is below a second predetermined threshold. Other embodiments of this aspect include corresponding computer systems, apparatus, and computer programs recorded on one or more computer storage devices, each configured to perform the actions of the methods.

Implementations may include one or more of the following features. The system where the memory contains further instructions which, when executed by the processing circuitry, further configure the system to extract alert terms from the plurality of cloud alerts; and normalize the alert terms, where normalizing the alert includes tokenizing the identifier of the cloud entity.

The system where the memory contains further instructions which, when executed by the processing circuitry, further configure the system to generate a frequency-based analysis to determine a uniqueness score for each normalized alert term.

The system where the memory contains further instructions which, when executed by the processing circuitry, further configure the system to adjust a weight of the alert term based on the uniqueness score of the normalized alert term.

The system where the memory contains further instructions which when executed by the processing circuitry further configure the system to train a generative AI model based on a training corpus, a training function and a selected loss function to generate a trained artificial neural network (ANN), where training function includes a backpropagation algorithm and a gradient descent algorithm; input the identifier of the cloud entity into the trained generative AI model; receive fuzzy search terms from the trained generative AI model based on the input; and perform the fuzzy search based on the fuzzy search terms.

The system where the memory contains further instructions which, when executed by the processing circuitry, further configure the system to identify fuzzy search terms based on an approximate-string-matching, and perform the fuzzy search based on the identified fuzzy search terms.

The system where the memory contains further instructions which, when executed by the processing circuitry, further configure the system to update the first predetermined threshold based on the mitigation action, and prioritize the mitigation action based on the probability.

The system where the memory contains further instructions which, when executed by the processing circuitry, further configure the system to recalculate the probability in response to determining the probability is between the first predetermined threshold and second predetermined threshold, where the first predetermined threshold and the second predetermined threshold are different numerical values.

The system where the memory contains further instructions which, when executed by the processing circuitry, further configure the system to retrieve one or more candidate code excerpts associated with a code object from the plurality of code objects; input, to a large language model (LLM) model, the one or more candidate code excerpts; and generate, via the LLM, an explanatory-alignment score, where the explanatory-alignment score is a degree of may include between the cloud alert and operations included in the one or more candidate code excerpts. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
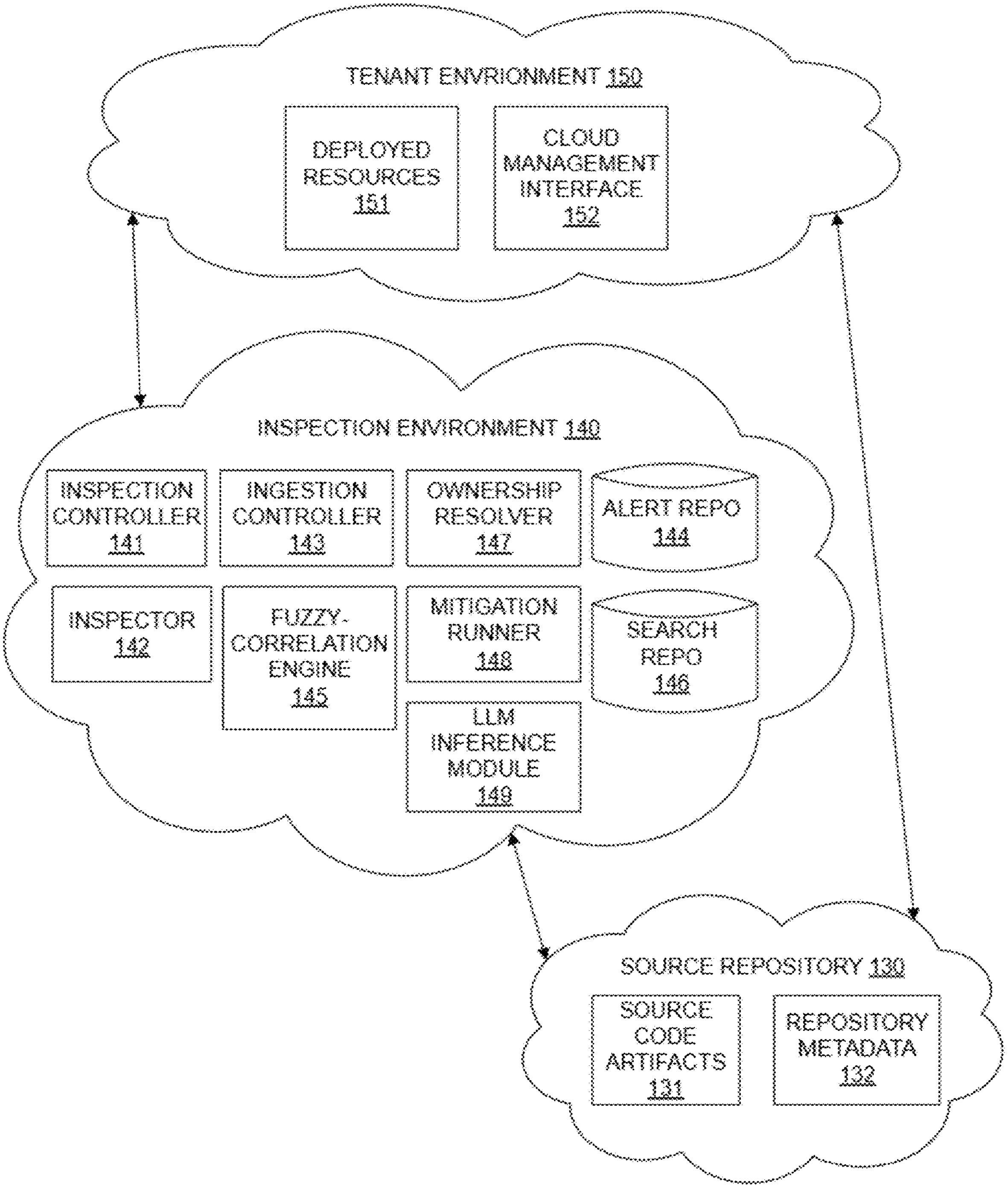
FIG. 1 is a schematic illustration of an example cloud computing environment that includes a cybersecurity monitoring system configured to monitor cloud alerts and perform noise-reduction operations, in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is a schematic illustration of an example cloud computing environment that includes a cybersecurity monitoring system configured to monitor cloud alerts and perform noise-reduction operations, in accordance with an embodiment.

In some embodiments, the cloud computing environment includes a source repository 130, inspection environment 140, and tenant environment 150. In some embodiments, a cybersecurity monitoring system includes the inspection environment 140.

In some embodiments, the source repository 130 includes source code artifacts 131 and repository metadata 132.

In some embodiments, the inspection environment 140 includes an inspection controller 141, an inspector 142, an ingestion controller 143, an alert repository 144, a fuzzy-correlation engine 145, a search repository 146, an ownership resolver 147, a mitigation runner 148, and a large language model (LLM) inference module 149.

In some embodiments, the tenant environment 150 includes deployed resources 151 and cloud management interface 152.

In some embodiments, the cybersecurity monitoring system is configured to receive a cloud alert generated in a cloud computing environment.

The cloud alert includes one or more alert terms such as resource names, API call identifiers, a combination thereof and the like. Each alert term identifies a cloud entity or operation associated with the event that triggered the alert.

In some embodiments, the cloud computing environment includes tenant environment 150. In some embodiments, the tenant environment 150 includes deployed resources 151 and cloud management interface 152.

In some embodiments, tenant environment 150 includes a plurality of entities. In an embodiment, an entity is a principal, a resource, and the like. In some embodiments, a computing environment is a cloud computing environment, an on-prem environment, a networked environment, a hybrid environment, a combination thereof, and the like. In some embodiments, a cloud computing environment is implemented on a cloud computing infrastructure, such as Amazon® Web Services (AWS), Google® Cloud Platform (GCP), Microsoft® Azure, a combination thereof, and the like.

In an embodiment, the tenant environment 150 includes a virtual private network (VPN), a virtual private cloud (VPC), a virtual network (VNet), a combination thereof and the like.

In some embodiments, the deployed resources 151 include one or more cloud-based workloads, virtual machines, containers, serverless functions, databases, and networking components provisioned within the tenant environment 150. In some embodiments, the cloud alert is generated based on events or anomalies associated with a deployed resource, such as abnormal API activity, configuration drift, or unauthorized access attempts. The deployed resources 151 represent the operational entities, such as virtual machines, containers, serverless functions, a combination thereof and the like, from which cloud alerts originate and form the contextual basis for correlation with source-code artifacts and configuration definitions during alert analysis.

In some embodiments, an ingestion controller 143 is configured to receive the cloud alert via one or more communication mechanisms. For example, the ingestion controller 143 is configured to receive the cloud alert via a push-based integration, a pull-based polling interface, a subscription-based event bus, a combination thereof and the like.

In an embodiment, a push-based integration includes an event stream in which a cloud service provider transmits alerts directly to a monitoring endpoint of the cybersecurity monitoring system. For example, a provider service such as Amazon® CloudWatch, Google® Cloud Logging, Microsoft® Sentinel, a combination thereof and the like, is configured to publish alert data through webhooks, RESTful APIs, or message brokers such as Amazon® Simple Notification Service (SNS), Apache® Kafka, a combination thereof and the like. The ingestion controller 143 is configured to expose an endpoint that authenticates, validates, and ingests the alert payload in near real time.

In another embodiment, the ingestion controller 143 is configured to poll a monitoring API of a cloud service provider to retrieve new or updated alerts. The ingestion controller 143 is configured to maintain synchronization markers, timestamps, and sequence identifiers to ensure continuity and prevent duplicate processing.

In some embodiments, the cybersecurity monitoring system subscribes to an event-routing layer implemented using a message queue or an event stream such as AWS EventBridge®, Google® Pub/Sub, Apache® Pulsar, a combination thereof and the like. This approach enables a scalable and decoupled architecture, allowing multiple consumers such as alert-correlation modules, data inspection workloads, and controllers to concurrently process incoming alerts.

In some embodiments, an inspection controller 141 is configured to manage and coordinate the reception of cloud alerts within the cybersecurity monitoring system. The inspection controller 141 is configured to provision and orchestrate one or more inspectors (such as inspector 142), each configured to monitor a specific source of telemetry or alert data in the cloud computing environment. For example, the inspector 142 is configured to subscribe to alert streams originating from cloud provider services, logging frameworks, code repositories, and workload monitoring agents, a combination thereof and the like.

According to an embodiment, the inspector 142 is configured to receive the cloud alert through one or more interfaces and to perform preliminary validation of the alert payload. The inspector 142 is configured to transmit the validated alert record to the inspection controller 141 for centralized management and routing to the ingestion controller 143 for processing.

In certain embodiments, the received cloud alert includes structured fields such as an identifier of the cloud entity, event name, resource type, resource identifier, principal identity, timestamp, region, associated contextual metadata, a combination thereof and the like. The ingestion controller 143 is configured to extract the one or more alert terms from these structured fields and to associate the extracted alert terms with their respective metadata.

In some embodiments, the cloud entity refers to a cloud-based resource, service component, or principal identity associated with the cloud alert. Each cloud entity includes an identifier such as a resource name, API call identifier, or function reference that uniquely identifies the entity within the cloud computing environment.

According to an embodiment, the ingestion controller 143 is configured to store each received and validated cloud alert as a structured record in an alert repository 144. The alert repository 144 is implemented as a data lake, a relational database, a graph database, a combination thereof and the like. Each structured record includes the cloud alert payload, the extracted alert terms, and associated metadata fields including timestamp, source service, principal identity, and event classification, a combination thereof and the like.

In some embodiments, the ingestion controller 143 is configured to normalize one or more alert terms extracted from the cloud alert stored in the alert repository 144. The ingestion controller 143 performs normalization to produce consistent textual representations of identifiers that originate from heterogeneous cloud services. Normalization is executed as a preprocessing stage that ensures the alert terms can be compared to code objects during fuzzy correlation with minimal ambiguity.

In an embodiment, the ingestion controller 143 is configured to normalize each extracted alert term.

In some embodiments, normalizing each alert term includes removing variable suffixes, prefixes, and dynamic substrings from each alert term. The ingestion controller 143 executes a rule-based parsing algorithm that segments the alert term into sub-strings using delimiter detection and lexical heuristics. Each sub-string is analyzed against a configuration table containing known pattern types including environment tags (e.g., "-prod," "-test"), version markers (e.g., "v1," "v2"), and region codes (e.g., "-us-east-1"). When a sub-string is determined to match a transient pattern, the ingestion controller 143 removes the corresponding segment, thereby generating a canonical base identifier.

In some embodiments, normalizing each alert term includes tokenizing the structured fields. In some embodiments, structured fields includes the identifier of the cloud entity, compound identifiers, a combination thereof and the like. In some embodiments, discrete components are the result of tokenizing the structured fields. In some embodiments, tokenizing includes deterministic tokenization.

For example, the ingestion controller 143 is configured to tokenize structured fields into discrete components. The ingestion controller 143 is configured to apply deterministic tokenization using both delimiter-based splitting and camel-case detection. For example, an alert term "CreateUserProdEast" is transformed into the tokens "create," "user," "prod," and "east." The ingestion controller 143 is further configured to compute a token-boundary confidence score based on character-type transitions, such that acronyms or contiguous uppercase sequences are preserved as single tokens when appropriate.

In some embodiments, the ingestion controller 143 is configured to standardize case and punctuation across the tokens. For example, the ingestion controller 143 converts all alphabetical characters to lowercase, removes punctuation symbols, and replaces non-alphanumeric delimiters with standardized separators. In some embodiments, standardizing the token is executed using a lightweight in-memory text-processing pipeline implemented within the ingestion controller 143 for low-latency processing.

In some embodiments, the ingestion controller 143 is further configured to distinguish dynamic noise artifacts from stable behavioral artifacts contained within the incoming cloud alerts. Dynamic noise artifacts include nondeterministic or ephemeral values such as transient process identifiers, randomized temporary file paths, auto-generated session tokens, or container-specific runtime directories. These elements exhibit high variability across executions and therefore do not provide reliable signals for correlation. In contrast, stable behavioral artifacts include persistent identifiers such as resource names, referenced filenames, command-line arguments, script hashes, function identifiers, or structured API call parameters.

In some embodiments, distinguishing dynamic noise artifacts from stable artifacts includes applying one or more artifact-stability classifiers to extracted cloud terms. In an embodiment, the ingestion controller 143) computes, for each extracted cloud term, a stability score based on one or more of: (i) pattern-recognition rules that match known ephemeral formats; (ii) entropy or character-distribution metrics indicating randomness; (iii) token-structure heuristics indicating numeric-only or high-variability suffixes; (iv) cross-alert frequency and variance measurements over a rolling window; and (v) contextual validation against allow-lists or schema dictionaries of known canonical identifiers, or a combination thereof. Cloud terms having stability scores below a predetermined threshold are classified as dynamic noise artifacts, while terms having stability scores above the predetermined threshold are classified as stable artifacts.

In some embodiments, the pattern-recognition rules include regular-expression patterns and path-signature detectors that identify ephemeral runtime values, including "/proc//fd/" paths, temporary directory paths, randomized file names, container runtime directories, session identifiers, and process identifiers (PIDs). In some embodiments, the entropy metrics include computing a Shannon-entropy value or n-gram rarity score for a substring of the cloud term, wherein substrings having entropy above a predetermined threshold are treated as nondeterministic. In some embodiments, the cross-alert variance measurements include tracking, for a given token position within a normalized term, a rate of change across multiple alerts, wherein token positions that vary above a predetermined rate are designated as transient and removed or down-weighted during normalization.

In some embodiments, cloud terms classified as dynamic noise artifacts are filtered, removed, masked, or down-weighted prior to fuzzy correlation, while cloud terms classified as stable artifacts (including referenced filenames, command-line arguments, script hashes, function identifiers, resource ARNs, or structured API call parameters) are prioritized for normalization and subsequent correlation operations, including generation of hypotheses and fuzzy search terms. In some embodiments, contextual validation includes comparing extracted tokens to canonical entries in the schema dictionary, wherein tokens that match canonical entries are assigned increased stability scores and tokens that fail dictionary validation are assigned decreased stability scores.

In certain embodiments, the ingestion controller 143 is configured to validate each normalized alert term against a schema dictionary. The schema dictionary includes canonical forms of known cloud resource identifiers and API calls. When a normalized term does not match any known canonical entry, the ingestion controller 143 assigns a "novelty" flag to the term and records its original and normalized representations for downstream analysis.

In some embodiments, the schema dictionary is stored as a versioned reference dataset within the alert repository 144 or another local datastore accessible to the ingestion controller 143. In some embodiments, the schema dictionary includes canonical identifier templates and field-level constraints for cloud-service events, including allowed API operation names, resource-type enumerations, parameter-key vocabularies, ARN formats, and known alias mappings that normalize synonymous terms to a common canonical form (e.g., mapping "CreateRole" and "CreateIAMRole" to a single canonical operation identifier). In some embodiments, the ingestion controller 143 uses the schema dictionary during normalization to (i) validate extracted tokens against expected token classes, (ii) remove or down-weight tokens that violate expected formats, and (iii) promote tokens that match canonical entries as stable artifacts. In some embodiments, the correlation report includes schema-validation results, including whether the normalized identifiers matched schema dictionary entries and which canonical entries were used to anchor hypothesis generation and candidate evaluation.

According to an embodiment, the ingestion controller 143 is configured to store the normalized alert terms and their associated metadata in the alert repository 144. The repository record includes the raw alert term, the normalized representation, token lists, token-boundary confidence values, novelty flags, a combination thereof and the like.

In some embodiments, a fuzzy-correlation engine 145 is configured to perform semantic matching among the normalized alert terms. Semantic matching includes determining conceptual relationships, such as similarity, between alert terms by analyzing their linguistic, syntactic, and contextual features.

In some embodiments, the fuzzy-correlation engine 145 is configured to employ an artificial-intelligence model to evaluate the semantic similarity of tokens.

In some embodiments, each normalized alert term is used as input to the semantic-embedding model, which produces one or more embedding vectors representing the semantic context of the alert term. In an embodiment, the embedding vector is a multidimensional vector.

In some embodiments, the semantic-embedding model is trained on a training corpus. For example, the training corpus includes historical alert data and curated term pairs. The curated term pairs include exact matches and near-matches to enable the semantic-embedding model to learn relationships between terms sharing related functional or operational contexts.

In some embodiments, the curated term pairs include exact-match examples that correspond to identifiers expressing identical functional intent but differing in textual formatting. For example, exact-match pairs include "CreateUserFunction" and "create_user_function," "DeleteS3Bucket" and "delete_bucket_s3," or "GetUserInfo" and "getuserinfo," a combination thereof and the like. These examples enable the semantic-embedding model to recognize textual variations such as case, delimiter style, and token order as equivalent expressions of the same operational concept.

In certain embodiments, the curated term pairs further include near-match examples that represent identifiers conveying related but non-identical functional meaning. For example, near-match pairs include "CreateUserFunction" and "AddUserHandler," "TerminateInstance" and "StopInstance," or "GetUserInfo" and "FetchUserDetails," a combination thereof and the like. These examples enable the semantic-embedding model to learn broader contextual relationships among alert terms that perform similar operations within the cloud computing environment, even when their textual structure differs.

During training, optimization techniques are applied to minimize semantic-distance loss between terms that are functionally related within the cloud computing environment.

In some embodiments, the semantic-embedding model is fine-tuned using organization-specific alert data. Fine-tuning applies additional training iterations using alerts originating from the organization's own cloud services and monitored resources so that the resulting embeddings reflect internal naming patterns and contextual usage. Fine-tuning improves the model's ability to differentiate semantically distinct alert terms that may otherwise appear textually similar.

In some embodiments, the semantic-embedding model produces a similarity score for each embedding. In other embodiments, the fuzzy-correlation engine 145 produces the similarity score for each embedding. The similarity score is a numerical representation on the relationship of each alert term to other alert terms in the embedding space. In some embodiments, the similarity scores are based on a distance metric between the embedding for the alert term and each other embedding for the other alert terms in the plurality of alert terms. In some embodiments, the distance metric cosine similarity, Euclidean distance, Manhattan distance, a combination thereof and the like.

In some embodiments, the fuzzy-correlation engine 145 compares the embedding vectors to determine search variants.

In some embodiments, the fuzzy-correlation engine 145 clusters the embeddings based on the similarity score. In some embodiments, clustering is performed using an unsupervised learning technique such as k-means, hierarchical agglomerative clustering, density-based spatial clustering (DBSCAN), a combination thereof and the like. The number of clusters or clustering threshold is dynamically determined according to the distribution of the similarity scores in the embedding space. Each cluster represents a grouping of alert terms exhibiting high semantic proximity based on the similarity score In some embodiments, a fuzzy form is determined for each cluster based on the alert terms in the cluster. In some embodiments, the fuzzy form is based on all of the alert terms in the cluster. In some embodiments, the fuzzy form is based on alert terms within the same cluster and terms within adjacent clusters having similarity scores exceeding a predetermined threshold.

For example, if the normalized alert term is CreateUserFunction, the fuzzy forms might include create_user_function, adduserhandler, user_create_func, function_create_user, a combination thereof and the like. Each fuzzy form is an example of a semantically similar form of the normalized alert term in text form.

In some embodiments, the fuzzy-correlation engine 145 is configured to identify one or more candidate code sources prior to executing a fuzzy search. The fuzzy-correlation engine 145 is configured to evaluate metadata extracted from the cloud alert and, when available, metadata extracted from workload-derived artifacts, including embedded repository identifiers, commit hashes, module paths, build-pipeline identifiers, package names, dependency manifests, container image references, a combination thereof and the like. Based on the extracted metadata, the fuzzy-correlation engine 145 narrows a search scope to a subset of repositories, modules, or workload-derived artifacts contextually associated with the alerting workload, thereby reducing computational overhead and improving correlation precision.

In some embodiments, a search variant is determined based on the cluster, one or more clusters, the fuzzy form, a combination thereof and the like.

In some embodiments, the search variant includes the original normalized alert term and the fuzzy form for one or more clusters, the similarity scores, a combination thereof and the like. The search variants represent semantically cohesive groups of alert terms suitable for use in subsequent fuzzy-search correlation.

For example, a search variant for CreateUserFunction might be stored as a structured record including CreateUserFunction (i.e., the normalized alert term), create_user_function, adduserhandler, user_create_func, function_create_user (i.e., one or more fuzzy forms), Cluster_12, Cluster_13 (i.e., one or more Cluster IDs) and adduserhandler: 0.91, function_create_user: 0.88 (i.e., one or more similarity scores).

In certain embodiments, the fuzzy-correlation engine 145 stores the semantic-matching results, embedding vectors, fuzzy forms, search variants, a combination thereof and the like, in the alert repository 144.

In some embodiments, a search substrate is identified based on metadata associated with the received cloud alert. The search substrate represents a searchable corpus constructed from text-based artifacts.

In some embodiments, the search substrates are obtained from an external code repository, an internal indexed codebase (such as the search repository 146), a combination thereof and the like.

In some embodiments, the inspection environment 140 is configured to perform agentless workload scanning of the deployed resources 151 to obtain workload-derived code artifacts, including disk snapshots of virtual machines, container images, and serverless deployment packages. In some embodiments, an artifact extractor is configured to extract source files, binaries, build manifests, package-manager files, dependency lockfiles, embedded version strings, and embedded repository identifiers from the workload-derived artifacts, and to store the extracted artifacts as an indexed search substrate in the search repository 146.

In some embodiments, the fuzzy-correlation engine is configured to identify one or more candidate code sources for a received cloud alert by evaluating metadata extracted from the workload-derived artifacts, including embedded git commit hashes, repository URLs, module paths, build pipeline identifiers, a combination thereof and the like, thereby narrowing a subsequent fuzzy search to a subset of repositories, extracted artifacts, a combination thereof and the like, associated with the alerting workload.

In some embodiments, the inspection environment 140 includes an LLM inference module 149 configured to generate ranked search hypotheses and to evaluate candidate code excerpts for behavioral alignment with the cloud alert. In some embodiments, the LLM inference module 149 is invoked by the fuzzy-correlation engine 145 to select candidate substrates, generate query forms, determine whether candidate code logic is capable of producing the cloud activity reflected in the cloud alert, a combination thereof and the like.

In some embodiments, the external code repositories include the source repository 130. In some embodiments, the source repository is a version-control system such as GitHub®, GitLab®, Bitbucket®, a combination thereof and the like.

In some embodiments, the inspection controller 141 is configured to communicate with the external code repositories through one or more application programming interfaces (APIs).

In some embodiments, the inspection controller 141 retrieves source code artifacts 131 and repository metadata 132 file contents via API requests and updates the external code-repository index (such as search repository 146). The retrieved data is stored in the search repository 146 for use during subsequent substrate selection and fuzzy-search correlation.

In some embodiments, the search repository 146 stores indexed code objects originating from multiple substrate types, including (i) source code artifacts 131 retrieved from the source repository 130 and (ii) workload-derived artifacts extracted from deployed resources 151. Each indexed code object includes tokenized text, embedding vectors, artifact type classification, and associated metadata fields, including repository identifier, workload identifier, container image digest, virtual-machine instance identifier, serverless function version, file path, and artifact provenance. This unified indexing enables fuzzy-search correlation across both repository-maintained code and deployed runtime artifacts.

In some embodiments, the source code artifacts 131 include programmatic and declarative assets retrieved from the source repository 130, such as source-code files, infrastructure-as-code templates, configuration management scripts, deployment manifests, operational definitions, documentation files describing resource configurations, a combination thereof and the like. In some embodiments, the source code artifact is parsed and indexed to generate structured entries containing tokenized text, embedding vectors, metadata such as repository identifier, file path, and artifact type, a combination thereof and the like.

In some embodiments, the repository metadata 132 includes file-path information, repository identifiers, commit histories, author information, access-control lists, ownership annotations/tags, a combination thereof and the like.

In some embodiments, the repository metadata 132 is retrieved from a repository-management system, version-control interface, a combination thereof and the like. According to an embodiment, an inspection controller 141 is configured to access repository-management system, version-control interface, a combination thereof and the like, through authenticated application programming interfaces (APIs). The inspection controller 141 is configured to query the repository services for ownership data, including most recent committers, designated maintainers, and associated team groups.

In some embodiments, an inspection controller 141 is configured to generate and maintain the internal indexed codebase. In some embodiments, the inspection controller 141 is configured to generate the internal indexed codebase based on artifacts including source-code repositories, infrastructure-as-code templates, configuration management files, deployment manifests, or other operational definitions, a combination thereof and the like. Each artifact is parsed, tokenized, and indexed using keyword-based or embedding-based indexing techniques to generate the search substrates.

In some embodiments, each indexed search substrate includes a plurality of code objects represented as structured or embedding-based entries. Each code object corresponds to a discrete artifact extracted from the code repository or infrastructure definition, such as a function, method, configuration element, or resource specification. The indexed representation of each code object includes tokenized text, embedding vectors, and associated metadata fields, including repository identifier, file path, and artifact type.

In some embodiments, the fuzzy-correlation engine 145 is configured to select one or more indexed search substrates based on metadata associated with a received cloud alert. The metadata used for selection includes alert-type classification, source service, resource category, event context, and associated alert terms, a combination thereof and the like.

In some embodiments, the inspection environment 140 further includes an LLM inference module 149 configured to generate structured search hypotheses for use by the fuzzy-correlation engine 145. The LLM inference module 149 receives as input the normalized alert terms, the stable artifacts extracted from the cloud alert, contextual metadata including service type, resource category, principal identity, and region, an event-sequence representation when available, descriptors of available search substrates stored in the search repository 146, a combination thereof and the like. The LLM inference module 149 produces, as structured output, one or more ranked search hypotheses, each including hypothesized query forms, candidate substrate identifiers, transformation operations, and evaluation criteria, including similarity thresholds or behavioral-alignment thresholds. The fuzzy-correlation engine 145 parses the structured output and stores the selected hypothesis within a search state record in the alert repository 144.

In some embodiments, the fuzzy-correlation engine 145 is configured to generate one or more search hypotheses for a cloud alert stored in the alert repository 144 prior to initiating the fuzzy search. A search hypothesis is a structured record representing an assumed correspondence between (i) one or more normalized alert terms and stable artifacts extracted from the cloud alert and (ii) one or more candidate code-object representations in a selected search substrate. In some embodiments, the search hypothesis includes one or more hypothesized query forms, one or more transformation operations applied to the alert terms, one or more substrate identifiers, and one or more evaluation criteria including similarity thresholds and contextual-alignment thresholds, a combination thereof and the like.

According to an embodiment, the fuzzy-correlation engine 145 references a substrate-mapping table that associates alert categories and resource types with corresponding substrate classifications. For example, alerts involving managed or third-party cloud services are mapped to an external code-repository index, whereas alerts involving custom workloads or internally maintained components are mapped to an internal indexed codebase.

In some embodiments, generating the one or more search hypotheses includes applying one or more hypothesis-generation operators to the normalized alert terms and stable artifacts. In some embodiments, the hypothesis-generation operators include: (i) suffix and prefix stripping to remove environment tags, region tags, or version markers; (ii) token substitution using semantically related tokens derived from a semantic-embedding model; (iii) token re-ordering or delimiter normalization to account for formatting variation; (iv) edit-distance relaxation using approximate-string-matching parameters; (v) scope expansion across multiple search substrates or repositories; and (vi) artifact-anchoring, wherein a hypothesis is constrained by one or more stable artifacts such as a referenced filename, command-line argument, script hash, resource ARN, or structured API-call parameter extracted from the cloud alert, a combination thereof and the like.

In certain embodiments, when multiple substrates are eligible, the fuzzy-correlation engine 145 evaluates metadata similarity scores and selects the substrate having the highest relevance to the alert's source context. The selected substrate identifiers are stored in the alert repository 144 for traceability and for initiating subsequent fuzzy-search operations.

In some embodiments, a fuzzy search is initiated to locate code objects associated with the cloud alert.

In some embodiments, the fuzzy-correlation engine 145 initiates a fuzzy search based on the identifier of the cloud entity associated with the received cloud alert, the plurality of code objects in the selected substrates, a combination thereof and the like. In certain embodiments, each identifier is compared against a plurality of code objects stored within the selected search substrates.

In some embodiments, each search substrate comprises a plurality of code objects represented as structured or embedding-based entries within the indexed data of a code repository. Each code object corresponds to a text-based artifact such as a source-code function, configuration definition, infrastructure resource specification, or deployment manifest, a combination thereof and the like.

In some embodiments, the fuzzy search is performed based on one or more fuzzy search terms. The fuzzy search terms represent text-based or embedding-based variants of the identifier of the cloud entity and are generated to capture semantically related expressions of the same functional concept. In some embodiments, the fuzzy search terms are identified using an artificial-intelligence model, one or more approximate-string-matching algorithms, or a combination thereof and the like.

In some embodiments, the artificial-intelligence model is trained using supervised or self-supervised learning techniques to learn semantic correspondences between alert identifiers and code objects. The training corpus includes pairs of cloud-alert identifiers and code-object representations derived from historical correlation data, code repositories, and prior fuzzy-search outcomes, a combination thereof and the like. During inference, the trained model receives as input the identifier of the cloud entity and produces a plurality of fuzzy search terms or matched code-object candidates ranked by semantic similarity score. Each fuzzy search term represents a predicted variation or contextually aligned expression suitable for use in the fuzzy search. In an embodiment, the trained model is an artificial neural network (ANN).

For example, when a normalized alert term includes a role name "Admin-Prod-US-East," a first hypothesis uses the full string as a query form against an internal indexed codebase. When the first hypothesis fails to produce a candidate match record satisfying a similarity threshold or contextual-alignment threshold, the fuzzy-correlation engine 145 generates a revised hypothesis by stripping suffixes and region indicators to produce a revised query form "Admin," and constrains the revised hypothesis using stable artifacts from the cloud alert, such as policy names, action strings, or resource ARNs, to evaluate whether returned candidates correspond to the permissions context associated with the cloud alert.

In some embodiments, the training of the artificial-intelligence model is based on a training algorithm. In some embodiments, a user selects the training algorithm. In some embodiments, the training algorithm is preselected by the cybersecurity monitoring system. In some embodiments, the selected training algorithm includes a backpropagation algorithm and a gradient-descent algorithm. For example, the selected training algorithm includes an iterative optimization process that adjusts model parameters to minimize a semantic-distance loss function computed across curated pairs of cloud-alert identifiers and code-object representations. For example, the backpropagation algorithm includes computing gradients of the loss function with respect to the model's internal weights by applying the chain rule across each layer of the model architecture, and propagating the gradients backward through the network. For example, the gradient-descent algorithm includes updating the model's parameters in the direction of the negative gradient to reduce the loss value, and may employ variants such as stochastic gradient descent, mini-batch gradient descent, or adaptive optimization methods including ADAM, RMSProp, or AdaGrad, a combination thereof and the like.

In some embodiments, the approximate-string-matching algorithms are configured to identify fuzzy search terms by analyzing textual similarity between the identifier of the cloud entity and indexed code objects. The approximate-string-matching algorithms include semantic-embedding comparison, cosine similarity, n-gram analysis, Levenshtein distance scoring, a combination thereof and the like. Each identified fuzzy search term derived from the approximate-string-matching algorithms is used to query the indexed code objects within the selected search substrate.

In certain embodiments, for each comparison, the fuzzy-correlation engine 145 generates a candidate match record including the matched code object identifier, its repository or file reference, the matching fuzzy form, the similarity score, and contextual metadata based on the fuzzy search, the selected search substrate, a combination thereof and the like.

In some embodiments, each candidate match record produced by the fuzzy search is further evaluated by behavioral correlation in which the fuzzy-correlation engine 145 analyzes whether execution logic within the candidate code object can produce a runtime event sequence reflected in the cloud alert, including by traversing an abstract syntax tree (AST), control-flow graph (CFG), call graph, or intermediate representation associated with the candidate code object.

In some embodiments, the inspection environment 140 includes an agentic-discovery agent configured to autonomously drive fuzzy-search correlation as a multi-step reasoning process. The agentic-discovery agent is configured to maintain a search state for a cloud alert stored in the alert repository 144, where the search state includes a current set of fuzzy search terms, a set of previously attempted search hypotheses, one or more intermediate similarity scores, one or more intermediate candidate match records, and one or more termination conditions, a combination thereof and the like. In some embodiments, the agentic-discovery agent operates in conjunction with the fuzzy-correlation engine 145 to iteratively update the fuzzy search terms and re-initiate fuzzy search operations against one or more indexed search substrates stored in the search repository 146.

In some embodiments, the fuzzy-correlation engine 145 maintains, for each cloud alert, a search state record in the alert repository 144. The search state record includes attempted hypotheses, resulting candidate match records, similarity scores, failure reasons, and a selected next hypothesis. In some embodiments, failure reasons include no matches above threshold, matches lacking artifact consistency, or matches inconsistent with alert metadata. The fuzzy-correlation engine 145 selects a next hypothesis based on the failure reason, including broadening or narrowing query forms, switching substrates, or anchoring subsequent hypotheses on additional stable artifacts extracted from the cloud alert, a combination thereof and the like.

In some embodiments, the agentic-discovery agent is configured to perform explicit failure handling when an initial fuzzy search attempt fails to produce a candidate match record satisfying a similarity threshold, a relevance threshold, a behavioral-alignment threshold, or a correlation-confidence threshold, a combination thereof and the like. In response to such failure, the agentic-discovery agent autonomously modifies a search strategy by generating one or more revised search hypotheses, where the revised search hypotheses include: removing environment tags, region codes, version markers, or other transient substrings from an identifier; replacing tokens with semantically related tokens derived from the semantic-embedding model; expanding a search scope from an internal indexed codebase to an external code-repository index or vice versa; increasing a maximum edit-distance parameter for an approximate-string-matching algorithm; or prioritizing different search substrates based on metadata associated with the received cloud alert, a combination thereof and the like.

In some embodiments, the fuzzy-correlation engine 145 is configured to generate one or more search hypotheses for a cloud alert stored in the alert repository 144. A search hypothesis is a structured record representing an assumed correspondence between (i) one or more normalized alert terms and stable artifacts extracted from the cloud alert and (ii) one or more candidate code-object representations in a selected search substrate. In some embodiments, the search hypothesis includes one or more hypothesized query forms, one or more transformation operations applied to the alert terms, one or more substrate identifiers, and one or more evaluation criteria including similarity thresholds and contextual-alignment thresholds, a combination thereof and the like.

In some embodiments, generating the one or more search hypotheses includes applying one or more hypothesis-generation operators to the normalized alert terms and stable artifacts. In some embodiments, the hypothesis-generation operators include: (i) suffix and prefix stripping to remove environment tags, region tags, or version markers; (ii) token substitution using semantically related tokens derived from a semantic-embedding model; (iii) token re-ordering or delimiter normalization to account for formatting variation; (iv) edit-distance relaxation using approximate-string-matching parameters; (v) scope expansion across multiple search substrates or repositories; and (vi) artifact-anchoring, wherein a hypothesis is constrained by one or more stable artifacts such as a referenced filename, command-line argument, script hash, resource ARN, or structured API-call parameter extracted from the cloud alert, a combination thereof and the like.

For example, when a normalized alert term includes a role name "Admin-Prod-US-East," a first hypothesis uses the full string as a query form against an internal indexed codebase. When the first hypothesis fails to produce a candidate match record satisfying a similarity threshold or contextual-alignment threshold, the fuzzy-correlation engine 145 generates a revised hypothesis by stripping suffixes and region indicators to produce a revised query form "Admin," and constrains the revised hypothesis using stable artifacts from the cloud alert, such as policy names, action strings, or resource ARNs, to evaluate whether returned candidates correspond to the permissions context associated with the cloud alert.

In some embodiments, the fuzzy-correlation engine 145 maintains, for each cloud alert, a search state record in the alert repository 144. The search state record includes attempted hypotheses, resulting candidate match records, similarity scores, failure reasons, and a selected next hypothesis. In some embodiments, failure reasons include no matches above threshold, matches lacking artifact consistency, or matches inconsistent with alert metadata. The fuzzy-correlation engine 145 selects a next hypothesis based on the failure reason, including broadening or narrowing query forms, switching substrates, or anchoring subsequent hypotheses on additional stable artifacts extracted from the cloud alert, a combination thereof and the like.

In some embodiments, the agentic-discovery agent is configured to execute an explicit iterative loop that includes: (i) selecting a current hypothesis from the search state; (ii) performing a fuzzy search using the current hypothesis; (iii) evaluating resulting candidate match records using similarity scores, contextual metadata, and prior outcomes; and (iv) updating the search state by either narrowing the search terms when candidate match records exhibit high similarity but low contextual alignment, or broadening the search terms when candidate match records are sparse or absent, a combination thereof and the like. For example, when a hypothesis yields multiple matches with high textual similarity across unrelated repositories, the agentic-discovery agent narrows the hypothesis by adding one or more stable behavioral artifacts extracted from the cloud alert (such as a referenced filename, command-line argument, script hash, or structured API call parameter). In another example, when a hypothesis yields no matches, the agentic-discovery agent broadens the hypothesis by stripping suffixes, relaxing token-order constraints, or applying a different approximate-string-matching algorithm.

In some embodiments, stable artifacts identified from the cloud alert are designated as anchor constraints for downstream behavioral correlation, wherein a candidate code path is preferentially scored when the path includes constants, parameter keys, filenames, hashes, API identifiers, a combination thereof and the like, that correspond to the stable artifacts extracted from the cloud alert.

In some embodiments, stable artifacts are designated as anchor constraints for downstream behavioral correlation, wherein a candidate code path is preferentially scored when the path includes constants, parameter keys, filenames, or API identifiers that correspond to the stable artifacts extracted from the cloud alert.

In some embodiments, the agentic-discovery agent terminates the iterative loop upon satisfaction of at least one termination condition, where the termination condition includes: identifying a candidate match record exceeding a configured similarity threshold; identifying a candidate match record exceeding a configured relevance threshold; reaching a maximum number of iterations; exhausting a set of candidate transformations; or determining that additional iterations would not materially improve semantic alignment based on a similarity-distribution variance metric, a combination thereof and the like. In some embodiments, the agentic-discovery agent stores, in the alert repository 144, a record of attempted hypotheses, intermediate candidate match records, intermediate scores, and a selected final hypothesis, thereby enabling traceability of the multi-step reasoning process and supporting subsequent threshold tuning or model refinement.

In some embodiments, the LLM inference module 149 is further configured to evaluate candidate code excerpts retrieved during fuzzy-search correlation to determine whether the operations implemented within the candidate code objects are capable of producing the cloud activity reflected in the cloud alert. In certain embodiments, the fuzzy-correlation engine 145 retrieves one or more candidate code excerpts and provides the excerpts, along with the event-sequence representation and stable artifacts, to the LLM inference module 149. The LLM inference module 149 generates an explanatory-alignment assessment indicating whether the candidate code logic is consistent with the observed runtime behavior, independent of identifier-name similarity. The explanatory-alignment assessment is converted into, used to augment, is a factor of, a combination thereof and the like, behavioral-alignment score associated with the candidate match record. In some embodiments, the explanatory-alignment assessment is qualitative, such as natural language. In some embodiments, the explanatory-alignment assessment is quantitative, such as a score.

In some embodiments, the fuzzy-correlation engine 145 is configured to extract, from a cloud alert stored in the alert repository 144, a sequence of events associated with the cloud alert. In some embodiments, the sequence of events is extracted from one or more structured fields of the cloud alert, including event name, API call identifier, resource identifier, principal identity, timestamp, request parameters, response codes, a combination thereof and the like. In some embodiments, the fuzzy-correlation engine 145 groups the extracted events into an ordered sequence based on timestamps or sequence identifiers, thereby generating an event-sequence representation for the cloud alert.

In some embodiments, the fuzzy-correlation engine 145 is configured to generate a behavioral signature for the cloud alert based on the event-sequence representation. In some embodiments, the behavioral signature includes normalized operation identifiers and one or more stable behavioral artifacts extracted from the cloud alert, including referenced filenames, command-line arguments, script hashes, function identifiers, resource ARNs, structured API call parameters, a combination thereof and the like. In some embodiments, the fuzzy-correlation engine 145 excludes dynamic noise artifacts from the event-sequence representation, wherein dynamic noise artifacts include nondeterministic or ephemeral values such as transient process identifiers, randomized temporary file paths, auto-generated session tokens, or container-specific runtime directories. In some embodiments, the behavioral signature is included in the event-sequence representation.

In some embodiments, the fuzzy-correlation engine 145 is configured to analyze one or more candidate code objects stored in one or more selected search substrates in the search repository 146 to determine whether the candidate code objects contain execution logic corresponding to the behavioral signature. In certain embodiments, code-object analysis includes generating or accessing an intermediate representation of a candidate code object, wherein the intermediate representation includes an abstract syntax tree (AST), a control-flow graph (CFG), a call graph, a combination thereof and the like. In some embodiments, the intermediate representation is generated by parsing a source code artifact 131 retrieved from the source repository 130 and associating the AST, CFG, or call graph with a code object identifier, repository identifier, and file reference included in an indexed representation of the candidate code object.

In some embodiments, the fuzzy-correlation engine 145 is configured to correlate the event-sequence representation to an execution path in the intermediate representation of a candidate code object. In some embodiments, correlating includes traversing the CFG, call graph, or AST-derived invocation sequences to determine whether the candidate code object contains a feasible execution path capable of producing a sequence of operations that matches the event-sequence representation in order, in substance, or both. For example, when the event-sequence representation includes an ordered chain of operations {CreateUser→AttachPolicy→GenerateAccessKey}, the fuzzy-correlation engine 145 identifies a corresponding execution path in the candidate code object that includes API invocations or function calls implementing the chain, optionally across conditional branches or loop constructs.

In some embodiments, the fuzzy-correlation engine 145 is configured to compute a behavioral-alignment score for a candidate code object based on a degree of alignment between the event-sequence representation and the feasible execution path. In some embodiments, the behavioral-alignment score is increased when the execution path includes stable behavioral artifacts corresponding to stable artifacts extracted from the cloud alert, and decreased when no feasible execution path is found that can produce the observed event sequence or when only partial matches are identified that fail ordering or parameter-consistency constraints, a combination thereof and the like.

In some embodiments, the fuzzy-correlation engine 145 augments each candidate match record with the behavioral-alignment score and stores the augmented candidate match record in the alert repository 144. In some embodiments, the behavioral-alignment score is used as an input to subsequent computation of weighted similarity scores, relevance scores, and correlation-confidence scores for the cloud alert.

In some embodiments, the fuzzy-search operations performed within the inspection environment are implemented as an iterative agentic-discovery loop rather than a single static search pass.

In some embodiments, the operations described herein as being performed by the fuzzy-correlation engine 145, the agentic-discovery agent, a combination thereof and the like, are allocated among one or more components of the inspection environment, including the ingestion controller 143, the inspector 142, the fuzzy-correlation engine 145, the inspection controller 141, or a combination thereof. Such allocation may be selected based on latency requirements, resource constraints, deployment architecture, or a trust boundary associated with an alert source.

In some embodiments, when initial correlation attempts fail to produce a sufficiently confident match, the ingestion controller 143, agentic-discovery agent, a combination thereof and the like, autonomously generates alternative search hypotheses. For example, if a full identifier such as "Admin-Prod-US-East" fails to yield relevant code objects, the ingestion controller 143 strips environment indicators, region codes, or deployment suffixes to generate alternative candidate fragments such as "Admin" or "Admin-Prod." The inspector 142, fuzzy-correlation engine 145, a combination thereof and the like, then re-initiates the search using these candidate variants. This iterative refinement continues until a match exceeding a similarity threshold is found, the set of candidate transformations is exhausted, or a maximum number of iterations is reached. The agentic-discovery loop enables autonomous hypothesis generation and adaptive search strategy refinement without requiring analyst intervention.

In some embodiments, the fuzzy-correlation engine 145 is configured to perform behavioral correlation. Behavioral correlation includes analyzing a sequence of cloud events associated with the cloud alert and determining whether the same or a substantially similar sequence of operations is represented within the execution logic of one or more code objects stored in the code repository. The behavioral correlation supplements name-based matching by evaluating whether the runtime activity can be explained by actual program behavior.

In some embodiments, the sequence of cloud events includes an ordered list of operations such as API calls, authentication operations, resource modifications, network communications, or command-line executions, a combination thereof and the like. The ingestion controller groups these events into behavioral chains that characterize the operational flow leading to the cloud alert. For example, a suspicious runtime script producing the series {CreateUser→AttachPolicy→GenerateAccessKey} is represented as an event-sequence signature.

In certain embodiments, each code object in the selected search substrates is analyzed to determine whether its internal logic contains a corresponding execution path. Code-object analysis includes control-flow-graph traversal, abstract-syntax-tree (AST) inspection, and semantic-pattern extraction, a combination thereof and the like. The system identifies whether the program contains a sequence of function calls, API invocations, or resource-modification instructions matching the behavioral chain derived from the cloud alert.

In some embodiments, the behavioral correlation produces a behavioral-alignment score. The behavioral-alignment score quantifies the degree to which the runtime event sequence aligns with the logical execution paths of one or more code objects. The ingestion controller combines the behavioral-alignment score with identifier-based similarity scores to refine the correlation-confidence score.

In some embodiments, the behavioral-alignment score is used as an input to a correlation-confidence score computed by the ownership resolver 147. In other embodiments, the behavioral-alignment score is used by the ingestion controller 143, the fuzzy-correlation engine 145, a combination thereof and the like, to perform a preliminary classification of the cloud alert as plausibly internal, plausibly external, or inconclusive, prior to aggregation and scoring by the ownership resolver 147.

In an embodiment, when the behavioral-alignment score is over a predetermined threshold, the ingestion controller 143 is configured to classify the cloud alert as being plausibly generated by internal code. In some embodiments, when the behavioral-alignment score is below the predetermined threshold or below a second predetermined threshold, the ingestion controller 143 is configured to classify the cloud alert as being external code. For example, when no code path is found that can produce the observed event sequence, a low behavioral-alignment score is generated and the ingestion controller 143 classifies the cloud alert as external code, prompting additional mitigation actions.

In some embodiments, an ownership resolver 147 is configured to aggregate the candidate match records. The aggregation includes grouping the candidate match records based on the cloud alert identifier, similarity scores, contextual metadata, matched code-object identifiers, a combination thereof and the like.

In certain embodiments, the ownership resolver 147 is configured to analyze the aggregated candidate match records to identify code references associated with each cloud alert based on a weighted similarity score.

In some embodiments, the weighted similarity score is based on repository type, artifact category, temporal proximity between alert generation, the behavioral-alignment score, a combination thereof and the like.

According to an embodiment, the ownership resolver 147 is configured to compute a relevance score for each candidate match record. In some embodiments, the relevance score is a numerical value based on the weighted similarity score, behavioral-alignment score, contextual weighting coefficients, and historical correlation accuracy, a combination thereof and the like. In some embodiments, candidate matches having relevance scores exceeding a configured threshold are designated as likely code references for the corresponding cloud alert.

In some embodiments, the inspection environment correlates runtime behavioral sequences from cloud alerts with execution paths extracted from source code artifacts stored in the source repository 130. When the cloud alert includes a sequence of API invocations, operational steps, or observable behavioral patterns, the correlation engine analyzes the abstract syntax tree (AST), control-flow graph (CFG), or other intermediate representations of candidate code objects to determine whether any execution path logically matches the observed sequence. The ingestion controller 143 traverses conditional branches, loop constructs, and function calls to identify feasible execution paths capable of producing the runtime behavior reflected in the alert. If a matching execution path is discovered, its associated code object is assigned elevated relevance during correlation, while candidates lacking a plausible behavioral match are deprioritized. This approach enables the system to capture functional causality rather than merely syntactic similarity between alert identifiers and code objects.

In some embodiments, the ownership resolver 147 is configured to filter generic alert terms.

In some embodiments, a generic alert term is determined based on an inverse-frequency metric.

In some embodiments, a term-frequency analysis includes computing, for each alert term, a corpus-frequency value that represents the number of occurrences of the alert term across the plurality of indexed code objects. The inverse-frequency metric is computed as the logarithmic inverse of the corpus-frequency value, producing higher values for rare terms and lower values for frequently occurring generic terms. In some embodiments, the inverse-frequency metric represents a numerical uniqueness metric.

For example, the ownership resolver 147 determines that the alert term "create" occurs 1,200 times across the indexed corpus, whereas "createUserFunction" occurs only 8 times. The inverse-frequency metric for "create" is correspondingly low, indicating a generic term, while the metric for "createUserFunction" is high, indicating a unique and distinctive alert term. In some embodiments, the ownership resolver 147 adjusts each relevance score inversely proportional to the corpus-frequency value or directly proportional to the uniqueness metric to reduce the weighting of generic matches and emphasize distinctive correlations.

In some embodiments, the ownership resolver 147 is configured to combine the relevance score, the uniqueness metric, the behavioral-alignment score to generate a correlation-confidence score for each cloud alert. The correlation-confidence score represents the overall likelihood that the cloud alert corresponds to one or more internally maintained code objects.

In some embodiments, the correlation-confidence score is computed using a weighted-scoring function that includes the normalized relevance score, the behavioral-alignment score, inverse-frequency uniqueness metric, contextual alignment parameters such as matching repository category and similarity-distribution variance, a combination thereof and the like.

In some embodiments, the ownership resolver 147 is configured to classify each cloud alert based on the correlation-confidence score and one or more predetermined thresholds. In some embodiments, the classifications includes originating from internal code, originating from external code, inconclusive, a combination thereof and the like.

For example, when the correlation-confidence score exceeds a predetermined threshold, the alert is classified as originating from internal code. In such an example, when the correlation-confidence score fails to exceed the predetermined threshold, the alert is classified as originating from external code. In other examples, the alert is classified as inconclusive.

In some embodiments, the one or more predetermined thresholds include a first predetermined threshold and a second predetermined threshold.

In some embodiments, when the correlation-confidence score is above the first predetermined threshold, the cloud alert is classified as originating from internal code. In some embodiments, originating from internal code includes originating from internal code repositories or code repositories marked as trusted.

In some embodiments, when the correlation-confidence score is below the second predetermined threshold, the cloud alert is classified as originating from external code.

In some embodiments, when the correlation-confidence score is below the first predetermined threshold and above the second predetermined threshold, the cloud alert is classified as inconclusive.

In some embodiments, when the cloud alert is classified as originating from internal code, the ownership resolver 147 is configured to remove or suppress the corresponding cloud alert from active alert queues within the cybersecurity monitoring system. Removing the alert prevents redundant processing of benign, internally generated events and contributes to overall noise reduction.

In some embodiments, the combined identifier-based similarity analysis and behavioral-alignment evaluation enable the cybersecurity monitoring system to distinguish benign, internally generated cloud alerts from anomalous or externally generated alerts. By identifying cloud alerts that correspond to internally maintained code objects or workload-derived artifacts exhibiting consistent execution logic, the system suppresses or removes alerts attributable to expected operational behavior, thereby reducing false positives and improving signal-to-noise ratio within the cybersecurity monitoring environment.

In some embodiments, the removal operation includes marking the alert record with a resolved status and storing its correlation data, including the matched code-object identifiers, confidence score, ownership information, a combination thereof and the like, within the alert repository 144 for traceability. The stored correlation record provides a historical reference that enables validation, auditing, and model retraining for subsequent correlation operations.

In some embodiments, when the cloud alert is classified as originating from external code, the ownership resolver 147 is configured to initiate a mitigation action. In some embodiments, the ownership resolver 147 is configured to request manual review of the cloud alert based on the cloud alert, generate a correlation report, a combination thereof and the like.

In some embodiments, when the cloud alert is classified as inconclusive, the ownership resolver 147 is configured to initiate a mitigation action based on the cloud alert, request manual review of the cloud alert, perform additional metadata retrieval with enhanced resources, recalculate a correlation-confidence score, generate a correlation report, a combination thereof and the like.

In some embodiments, the ownership resolver 147 is configured to execute a resolution operation following generation of the correlation-confidence score for each cloud alert. The resolution operation determines the subsequent handling of the alert within the cybersecurity monitoring system based on the computed confidence value and predefined threshold criteria.

In certain embodiments, the resolution operation is configured to terminate the correlation loop. In some embodiments, the termination of the correlation loop includes feeding the recorded resolution data into a feedback mechanism for adaptive threshold tuning and model refinement. In some embodiments, the inspection controller 141 is configured to analyze historical resolution outcomes to optimize future decision thresholds and improve classification accuracy between internally and externally originated alerts. For example, a mitigation action was initiated based on a false positive; the value of the first predetermined threshold is reduced to capture more internal noise.

In some embodiments, the ownership resolver 147 is configured to identify potential code owners.

In some embodiments, the identification of the potential code owners is based on a correlation of the candidate code objects with the cloud alert.

In some embodiments, the correlation is performed by evaluating repository metadata (such as the repository metadata 132) to each matched code object.

In some embodiments, correlation further includes applying string-matching or embedding-based similarity techniques to author identifiers and team names, evaluating organizational hierarchies to infer ownership relationships, or applying clustering across commit-history embeddings to identify contributors exhibiting high semantic proximity to the alert context.

In some embodiments, the correlation includes correlating the repository metadata 132 to contextual metadata of the cloud alert.

In some embodiments, the inspection controller 141 is configured to parse the repository metadata 132. In some embodiments, the ingestion controller 143 is configured to augment the repository metadata 132 by extracting contributor identities, repository maintainers, responsible development teams, a combination thereof and the like, of each code object.

In some embodiments, the version-control interface includes GitHub®, GitLab®, Bitbucket®, a combination thereof and the like.

In some embodiments, the repository metadata 132 is weighted based on heuristics, pre-defined rules, a combination thereof and the like. For example, the ownership resolver 147 is configured to weight recent committers more heavily than historical contributors, to account for active ownership, based on the heuristic. In another example, ownership priority is determined based on commit volume, code proximity (shared file modules), or explicit assignment labels defined in repository metadata, a combination thereof and the like.

In some embodiments, the contextual metadata of the cloud alert includes principal identity, resource type, service domain, a combination thereof and the like.

In some embodiments, the identified potential code owners are associated with each correlated cloud alert and stored in the alert repository 144. Each ownership record includes the cloud alert identifier, matched code-object identifiers, repository reference, contributor identities, and ownership confidence scores, a combination thereof and the like. The ownership confidence score is computed as a weighted combination of metadata recency, contributor activity, and repository-defined ownership annotations.

In certain embodiments, the ownership resolver 147 is configured to generate a correlation report.

In some embodiments, the correlation reports includes all cloud alerts. In some embodiments, the correlation report includes a subset of the cloud alerts. In some embodiments, the subset is determined based on a user preference. For example, based on a specific number of the most recent cloud alerts.

In some embodiments, the correlation report includes alert identifier, metadata associated with the alert, candidate matches, similarity scores, relevance scores, uniqueness metrics, correlation-confidence scores, ownership information, classification outcome (e.g., originating from internal code, originating from external code, inconclusive), a combination thereof and the like, associated with the cloud alert. In some embodiments, the correlation report further includes a source repository (such as the source repository 130) associated with the potential code owner, remediation owner associated with the potential code owner, a combination thereof and the like.

In some embodiments, the correlation report is formatted as a structured record, stored in the alert repository 144, a combination thereof and the like.

In some embodiments, the ownership resolver 147 is configured to transmit the correlation report via notification systems, dashboards, or API endpoints integrated with existing cloud monitoring workflows.

In some embodiments, the correlation report is ranked based on correlation-confidence scores, similarity scores, relevance scores, a combination thereof and the like.

In some embodiments, the mitigation action is based on the correlation-confidence score. For example, In some embodiments, the mitigation action is prioritized based on the correlation-confidence score. For example, mitigation actions initiated in response to cloud alerts with lower correlation-confidence score (i.e., more likely to be originating from external code) are prioritized over mitigation actions initiated in response to cloud alerts with larger correlation-confidence score (i.e., more likely to be originating from internal code).

In some embodiments, the mitigation action includes invoking a response workflow, generating a remediation event, or issuing a containment command via a cloud management interface, a combination thereof and the like.

In some embodiments, the mitigation action for a cloud alert classified as inconclusive is deferred until mitigation actions for cloud alerts classified as originating from external code are initiated, manual review of the cloud alerts classified as inconclusive, additional contextual information is available, a combination thereof and the like.

According to an embodiment, a mitigation runner 148 communicates with cloud management interface 152. In some embodiments, the cloud management interface 152 includes cloud-provider management APIs, security orchestration, automation, and response (SOAR) systems, a combination thereof and the like, to perform or initiate the mitigation action. Example mitigation actions include isolating an affected virtual machine, disabling compromised credentials, reverting a configuration state, or generating an incident ticket for manual triage, a combination thereof and the like.

In some embodiments, the mitigation runner 148 records the resolution operation, outcome of the resolution operation, associated metadata (threshold values, timestamps, a combination thereof and the like) a combination thereof and the like, within the alert repository 144.

In some embodiments, the correlation report is updated based on the subsequent resolution operations, outcome of the resolution operation, a combination thereof and the like.

In some embodiments, the mitigation action is based on the ranked correlation report.

In some embodiments, the mitigation runner 148 is configured to transmit the mitigation action to an external security information and event management (SIEM) platform, an incident-management system, an observability dashboard, a combination thereof and the like.

In some embodiments, the methods disclosed herein are executed in either an automated background-enrichment mode or an on-demand investigation mode.

In the automated mode, the ingestion controller 143 continuously monitors the cloud computing environment, continuously receives cloud alerts, and executes the correlation and classification pipeline asynchronously. In some embodiments, correlation reports are generated and mitigation actions are initiated automatically without human intervention. In certain embodiments, automated action is initiated when a correlation-confidence score, similarity score, or other evaluation metric exceeds a predefined operational threshold stored in a system configuration file or policy database. The operational threshold values are configurable according to organizational preferences.

In the on-demand investigation mode, a user (e.g., an analyst, network administrator, security personnel, a combination thereof and the like) or an automation workflow initiates the fuzzy-correlation process for selected alerts. The ingestion controller 143 is configured to retrieve historical alerts, perform semantic matching, compute correlation-confidence scores, and output correlation reports dynamically in response to an investigation request.

According to an embodiment, mode selection is governed by configuration parameters within the cybersecurity monitoring system. The ingestion controller 143 and inspection controller 141 are configured to transition between automated and on-demand execution modes without interrupting alert ingestion or repository indexing operations.

In some embodiments, the inspection environment 140 further includes a workload scanner configured to perform agentless acquisition of code artifacts from deployed resources 151 within the tenant environment 150. In certain embodiments, the workload scanner retrieves one or more of: virtual-machine disk snapshots, container images, serverless deployment packages, infrastructure deployment bundles, or runtime file-system captures associated with a workload that generated a cloud alert. The workload scanner operates without requiring installation of agents within the deployed resources and instead utilizes cloud-provider snapshot APIs, image registries, or artifact-export mechanisms exposed through the cloud management interface 152.

In some embodiments, an artifact extractor is configured to process the workload-derived artifacts to extract text-based and binary artifacts, including source files, compiled binaries, configuration files, infrastructure-as-code templates, deployment manifests, dependency lockfiles, build manifests, embedded version identifiers, repository URLs, commit hashes, module paths, or other repository-identifying metadata. The extracted artifacts are parsed, tokenized, and converted into indexed code-object representations for inclusion within the search repository 146 as workload-derived search substrates.

Figure 2:
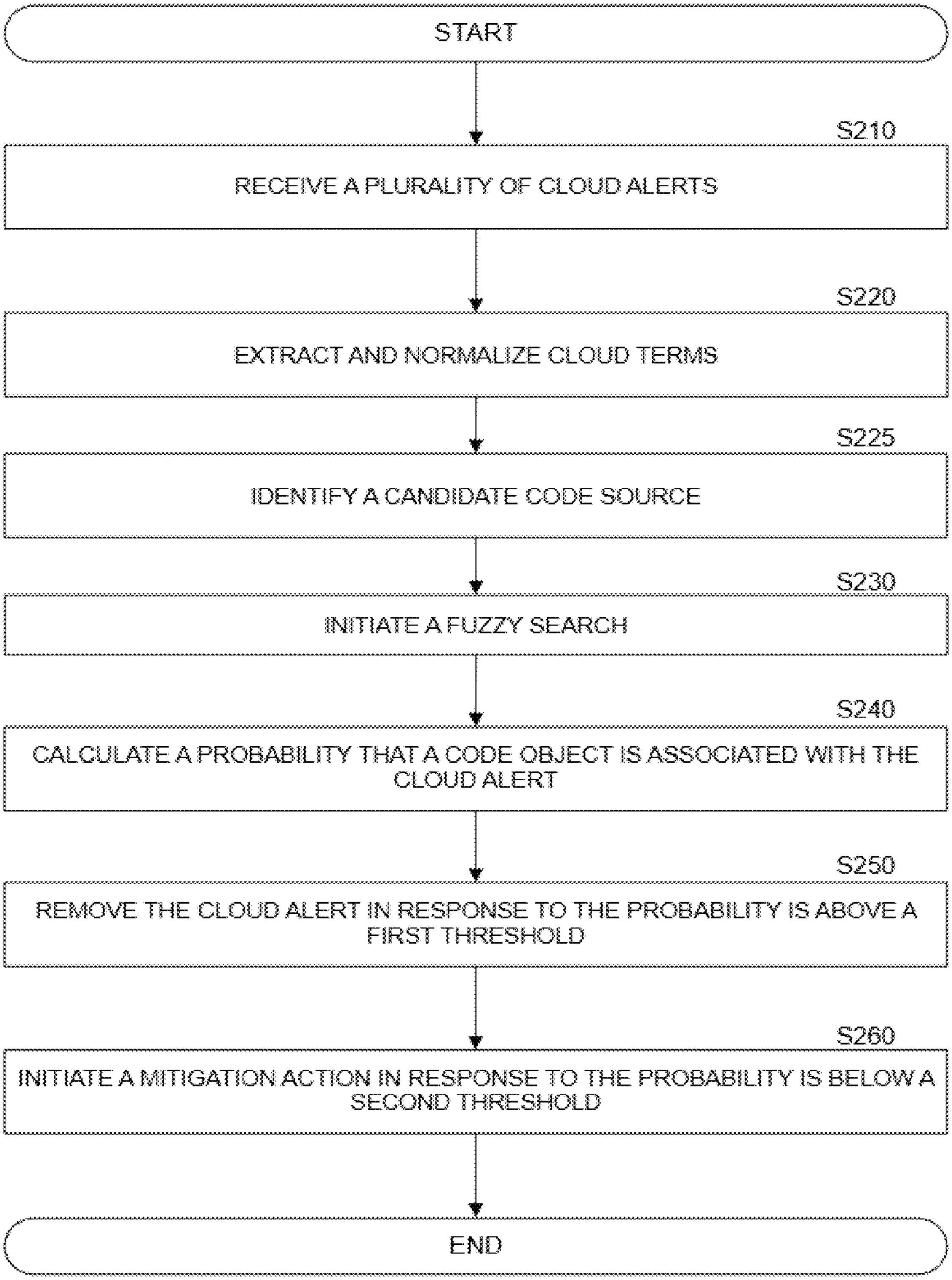
FIG. 2 is an example flowchart illustrating a method for noise reduction and alert correlation in a cloud computing environment.

FIG. 2 is an example flowchart illustrating a method for noise reduction and alert correlation in a cloud computing environment.

At S210, a plurality of cloud alerts is received. In some embodiments, a cloud alert is an event notification generated by a cloud service provider or monitoring system that signals an activity, condition, or anomaly occurring within the cloud computing environment. In an embodiment, each cloud alert includes one or more alert terms such as resource names, API call identifiers, or service operation identifiers that describe the entity or action that triggered the alert. In some embodiments, the ingestion controller 143 is configured to receive cloud alerts via push-based integrations, pull-based polling interfaces, or subscription-based event buses.

For example, a monitoring service such as Amazon® CloudWatch or Google® Cloud Logging transmits an alert identifying the API call "CreateUserFunction" executed by an internal workload. The alert payload is received at a monitoring endpoint of the cybersecurity monitoring system through a RESTful API and ingested into the alert repository 144.

At S220, cloud terms are extracted and normalized. In some embodiments, the cloud terms are extracted from the plurality of cloud alerts. In some embodiments, the cloud terms are values stored in structured fields. In some embodiments, the cloud terms include an identifier of the cloud entity. In some embodiments, the cloud entity includes a cloud-based resource, service component, principal identity, a combination thereof and the like, associated with the cloud alert. Each cloud entity includes an identifier such as a resource name, API call identifier, function reference, a combination thereof and the like, that uniquely identifies the entity within the cloud computing environment. In some embodiments, the normalization includes filtering the extracted cloud terms as dynamic noise and stable artifacts. A stability score for each extracted cloud term is generated based on a pattern-recognition rules that match ephemeral formats, an entropy metric indicating randomized substrings, a token-structure heuristics indicating high-variability suffixes or numeric-only identifiers, a cross-alert frequency and variance measurements over a rolling window, a combination thereof and the like. For example, paths matching "/proc//fd/", values containing transient process identifiers (PIDs), or high-entropy session tokens are assigned low stability scores and classified as dynamic noise artifacts.

In some embodiments, cloud terms classified as dynamic noise artifacts are filtered, removed, masked, or down-weighted prior to fuzzy correlation, while cloud terms classified as stable artifacts (including referenced filenames, command-line arguments, script hashes, function identifiers, resource ARNs, or structured API call parameters) are prioritized for normalization and subsequent correlation operations, including generation of hypotheses and fuzzy search terms.

For example, from the alert payload containing "CreateUserProdEast," the ingestion controller 143 extracts and normalizes the term by removing transient substrings (e.g., "prod," "east") to generate the canonical identifier "CreateUser." The normalized term is tokenized into discrete components ("create," "user") and standardized for case and punctuation before being stored in the alert repository 144.

In some embodiments, the system is further configured to distinguish dynamic noise artifacts from stable behavioral artifacts contained within the cloud alert. Dynamic noise artifacts include ephemeral or nondeterministic elements such as transient process identifiers, randomized temporary file paths (e.g., "/proc/*/fd/*"), container-specific runtime directories, execution timestamps, and auto-generated session tokens. These elements are excluded from downstream correlation because they do not convey stable behavioral meaning. In contrast, stable artifacts include cloud-entity identifiers, script names, command-line arguments, referenced function names, resource ARNs, and other deterministic indicators that persist across multiple executions of the same workload. The ingestion controller identifies and filters dynamic noise elements using pattern-recognition rules, frequency heuristics, or machine-learned classifiers, and prioritizes stable artifacts for semantic processing and subsequent fuzzy-search correlation.

At S225, one or more candidate code sources are identified for a fuzzy search. In some embodiments, the fuzzy-correlation engine 145 is configured to identify candidate code sources by using signals derived from agentless workload scanning of the alerting environment, including code extracted from virtual-machine disk snapshots, container images, and serverless deployment packages. In some embodiments, the system further extracts and evaluates artifact metadata, including build manifests, package-manager files, dependency lockfiles, embedded version strings, symbol tables, and embedded repository identifiers such as git commit hashes, repository URLs, or build pipeline identifiers. The identified candidate code sources are used to narrow the search scope of subsequent fuzzy-search correlation to a subset of repositories, packages, or extracted code artifacts that are contextually associated with the alerting workload. In some embodiments, the workload-derived code artifacts are designated as a primary search substrate when repository connectivity is unavailable or when workload-derived identifiers provide stronger provenance signals than repository metadata.

For example, in response to an alert generated by a containerized workload, the system retrieves a container image associated with the workload via an agentless scan, extracts a deployment package and dependency manifest, and identifies an embedded git commit hash and module path. The system uses the extracted metadata to select a subset of code sources for fuzzy search, including a corresponding internal repository and a specific module directory, rather than searching across all indexed repositories.

At S230, the fuzzy search is initiated. In some embodiments, the fuzzy search is initiated against the identified candidate code sources. In some embodiments, the fuzzy search is performed using one or more search techniques, including a generative artificial-intelligence model, an approximate-string-matching algorithm, or a combination thereof and the like. In some embodiments, the generative artificial-intelligence model is trained using supervised or self-supervised learning on pairs of cloud-alert identifiers and code-object representations to predict similarity scores or matched code-object identifiers. In some embodiments, the approximate-string-matching algorithm includes semantic-embedding comparison, cosine similarity, n-gram analysis, Levenshtein-distance scoring, a combination thereof and the like.

In some embodiments, the fuzzy search is executed against a plurality of code objects stored in a code repository. The plurality of code objects includes source-code functions, configuration definitions, infrastructure-as-code resources, deployment specifications, or other text-based artifacts represented as tokenized or embedding-based entries within the indexed data.

For example, the generative artificial-intelligence model receives the normalized identifier "CreateUser" and produces semantically similar variants such as "adduserhandler" and "function_create_user." These variants are used as query terms for fuzzy correlation against indexed code objects.

In another example, an approximate-string-matching algorithm such as Levenshtein distance or n-gram comparison is applied between "CreateUser" and code identifiers contained in the indexed repository. Matches exceeding a configured similarity threshold are identified as potential correlations.

At S240, a probability that a code object of the plurality of code objects is associated with the cloud alert is determined based on the fuzzy search. In some embodiments, the probability is computed as a correlation-confidence score representing the semantic similarity and contextual alignment between the alert identifier and each code object. The correlation-confidence score is based on weighted similarity metrics, relevance scores, uniqueness values, a behavioral-alignment score, a combination thereof and the like. In some embodiments, a behavioral-alignment score is calculated by correlating an event-sequence representation derived from the cloud alert with a feasible execution path identified in an AST, CFG, or call graph of a candidate code object. In some embodiments, the correlation-confidence score includes the behavioral-alignment score as a factor.

For example, when "CreateUser" exhibits a cosine similarity of 0.92 to a function definition named "create_user_function" in an internal repository, the correlation-confidence score is assigned a high value indicating strong association. In an embodiment, the probability is a value, such as a quantitative value, a qualitative value, a combination thereof, and the like. A quantitative value may be, for example, '0' through '1', and a qualitative value may be, for example, 'low', 'high', etc.

In some embodiments, correlating the fuzzy-search results includes mapping runtime behavioral sequences detected in the cloud alert to corresponding execution paths within the source code. For example, when the alert includes a sequence of cloud-API calls or operational events, the system analyzes the abstract syntax tree (AST), control-flow graph (CFG), or intermediate representation (IR) of each candidate code object to identify whether the code implements a logically consistent sequence of operations that explains the alert behavior. In some embodiments, the ingestion controller traverses conditional branches, loop structures, and function-invocation relationships to determine whether a feasible execution path in the code matches the runtime sequence. If a match is identified, the associated code path is assigned an elevated relevance score, an elevated behavioral-alignment score, non-matching candidates are deprioritized, a combination thereof and the like. This correlation ensures that the system identifies not just syntactic similarity but functional causality between the executed behavior and the underlying code.

At an optional S250, the cloud alert is removed from the cybersecurity monitoring system in response to the probability exceeding a first predetermined threshold. In some embodiments, removal includes marking the alert record with a resolved status and storing its correlation data in the alert repository 144 for traceability and future model optimization. This operation suppresses benign alerts originating from internally maintained code and reduces alert noise within the monitoring system.

For example, if the correlation-confidence score for a cloud alert exceeds 0.9 and the alert is linked to an internal function definition, the alert is automatically classified as internal and removed from the active alert queue.

At an optional S260, a mitigation action is initiated based on the cloud alert in response to the probability being below a second predetermined threshold. In some embodiments, the mitigation action is executed via a cloud-management interface or security orchestration, automation, and response (SOAR) system. The action may include isolating a virtual machine, revoking a compromised credential, rolling back a configuration change, or generating an incident ticket for manual review.

For example, when the correlation-confidence score for a cloud alert is below 0.4, and the alert indicates an unauthorized API call from an external principal identity, the ingestion controller 143 communicates with the cloud-provider API to disable the credential and logs the mitigation action for auditing purposes.

Figure 3:
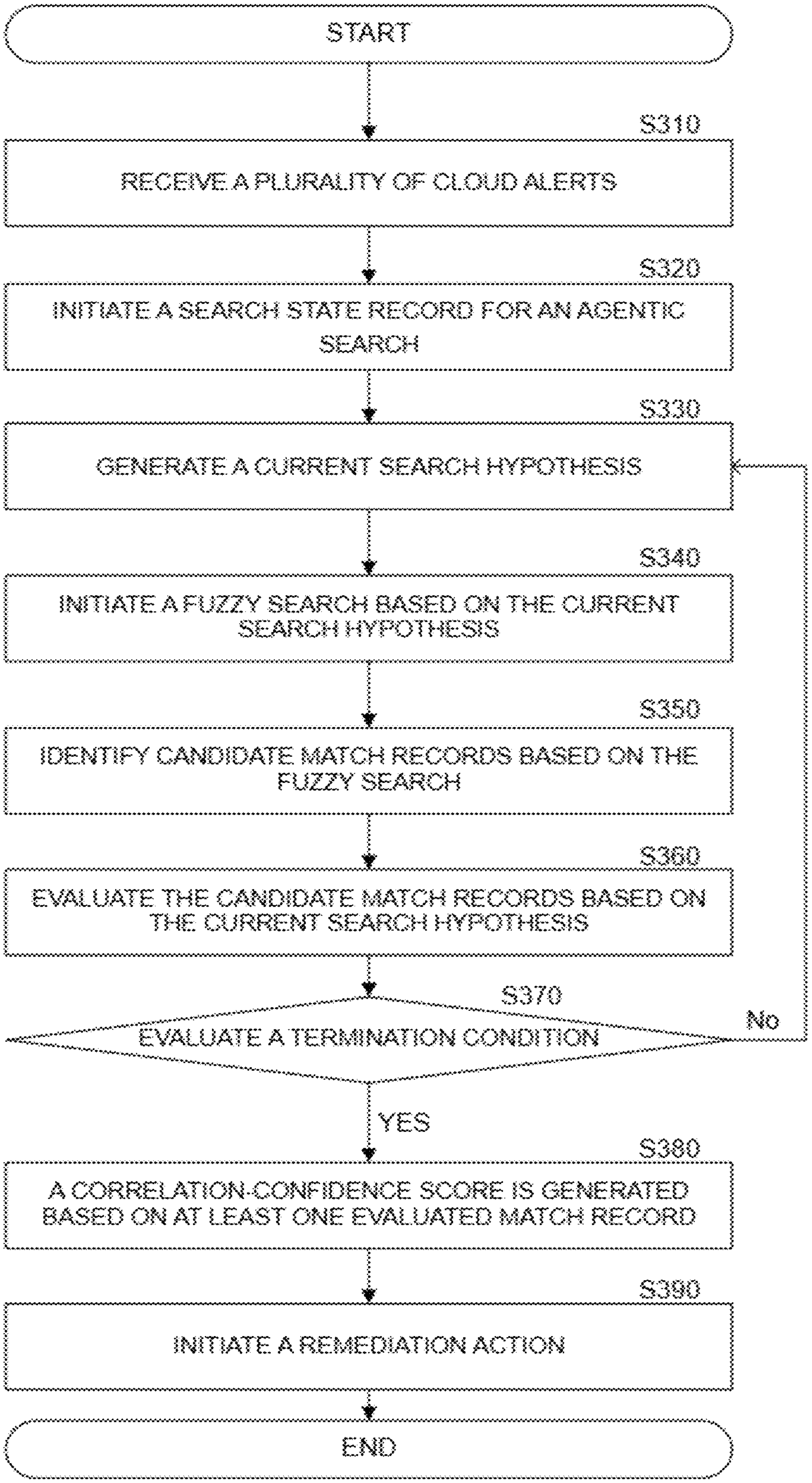
FIG. 3 is an example flowchart illustrating an agentic-discovery fuzzy-search method for correlating a cloud alert with one or more code objects, in accordance with an embodiment.

FIG. 3 is an example flowchart illustrating an agentic-discovery fuzzy-search method for correlating a cloud alert with one or more code objects, in accordance with an embodiment.

At S310, a plurality of cloud alerts is received. In some embodiments, the cloud alerts are received from a tenant environment. In some embodiments, the cloud alerts are retrieved from a repository (such as the alert repository 144). In some embodiments, the ingestion controller 143 is configured to extract one or more cloud terms from the cloud alert and normalize the cloud terms. In some embodiments, normalizing includes tokenizing identifiers, standardizing case and punctuation, and removing variable prefixes, suffixes, and dynamic substrings, a combination thereof and the like, in the one or more cloud terms. In some embodiments, normalizing the cloud terms includes identifying and filtering dynamic noise artifacts from the extracted cloud terms.

For example, the ingestion controller 143 receives a cloud alert indicating an IAM role creation event with an identifier "Admin-Prod-US-East," a principal identity, and a set of request parameters. The ingestion controller 143 extracts cloud terms from the alert payload, normalizes the role name by removing region and environment suffixes to produce "Admin," and filters dynamic noise artifacts such as session identifiers or ephemeral runtime paths prior to storing the normalized terms in the alert repository 144.

At S320, a search state record for an agentic search state is initiated. In some embodiments, the fuzzy-correlation engine 145 is configured to initialize a search state record for the cloud alert. The search state record includes normalized cloud terms, stable artifacts, one or more candidate search substrates, attempted hypotheses, intermediate candidate match records, termination conditions, a combination thereof and the like. The candidate search substrates include an internal indexed codebase, an external code-repository index, workload-derived code artifacts, agentlessly extracted deployed code artifacts obtained from workload scanning of the tenant environment, a combination thereof and the like.

For example, the search state record is initialized to include a normalized role identifier ("Admin"), a stable artifact set including policy names and resource ARNs extracted from the cloud alert, and a list of candidate search substrates including an internal indexed codebase, an external code-repository index and a workload-extracted artifact substrate comprising code extracted from a container image or disk snapshot associated with the alerting workload. The search state record further includes an empty hypothesis history and termination criteria, including a maximum number of hypothesis iterations.

At S330, a current search hypothesis is generated based on the search state record. In some embodiments, the fuzzy-correlation engine 145 is configured to generate the current search hypothesis by invoking a large language model (LLM). The fuzzy-correlation engine 145 constructs a structured prompt including normalized cloud terms, stable artifacts extracted from the cloud alert, alert metadata including service type, resource category, principal identity, and region, an event-sequence representation, when available, descriptors of available search substrates, a combination thereof and the like. The LLM processes the structured prompt and outputs a structured hypothesis record including one or more hypothesized query forms, one or more candidate substrate identifiers, one or more transformation operations, and one or more evaluation criteria including similarity or behavioral-alignment thresholds. In some embodiments, the LLM generates the structured hypothesis record by performing contextual inference to predict what types of code artifacts, infrastructure definitions, libraries, API invocations, a combination thereof and the like, would be capable of producing the operations reflected in the cloud alert. The LLM ranks multiple hypotheses, each associated with a predicted likelihood of explanatory alignment. The fuzzy-correlation engine 145 parses the structured output of the LLM and stores the structured hypothesis record in the search state record as the current search hypothesis.

For example, the fuzzy-correlation engine 145 constructs a structured prompt for an LLM that includes (i) the normalized role identifier ("Admin"), (ii) stable artifacts extracted from the cloud alert, including one or more policy action strings and resource ARNs, and (iii) alert metadata indicating an IAM role creation event in a production tenant. Based on processing the prompt, the LLM outputs a ranked set of search hypotheses. In an embodiment, a first search hypothesis specifies searching an agentlessly extracted workload-code substrate (e.g., a container image or VM disk snapshot associated with the alerting workload) using query forms including "admin role," "iam role," and "create_role," with evaluation criteria requiring a behavioral-alignment score exceeding a predetermined threshold. In an embodiment, a second search hypothesis specifies searching an internal indexed codebase using a query form that combines the normalized identifier with stable artifacts (e.g., "Admin" AND "iam: CreateRole" AND a matching resource ARN prefix), and further specifies an evaluation threshold requiring a similarity score exceeding 0.85 or a combined confidence score exceeding a predetermined threshold.

At S340, a fuzzy search is executed based on the current search hypothesis. In some embodiments, the fuzzy-correlation engine 145 executes a fuzzy search against one or more indexed search substrates stored in the search repository 146. In some embodiments, the fuzzy search includes one or more of: embedding-based semantic search, approximate-string-matching, and generative artificial-intelligence model matching. In some embodiments, the fuzzy search further includes LLM-assisted code comprehension in which the system retrieves candidate code excerpts and the LLM evaluates whether the candidate code's operations can produce the cloud activity reflected in the cloud alert, independent of identifier-name similarity.

In some embodiments, the fuzzy-search includes agentic-discovery loop in which the fuzzy-correlation engine 145 is configured to record each attempted hypothesis and intermediate outcome and autonomously selects a subsequent hypothesis based on one or more failure conditions. For example, when an initial fuzzy search yields no candidate match record exceeding a similarity threshold, the fuzzy-correlation engine 145 is configured to modify one or more search parameters and re-executes the fuzzy search, including broadening or narrowing search terms, changing a search substrate selection, or substituting semantically related tokens produced by a semantic-embedding model, until a termination condition is satisfied. In some embodiments, upon detecting a failure condition, the fuzzy-correlation engine 145 invokes the LLM to generate a revised hypothesis that changes substrate selection, modifies query forms, specifies additional behavioral constraints based on the intermediate outcomes, a combination thereof and the like.

For example, the fuzzy-correlation engine 145 executes an embedding-based search using the query form "Admin" against the search repository 146, and further executes an approximate-string-matching query to identify code objects containing similar identifiers such as "AdminRole," "AdministratorRole," or "admin_role." The engine retrieves candidate results across infrastructure-as-code templates, deployment manifests, and source-code functions indexed in the search repository 146. In some embodiments, the fuzzy-correlation engine 145 retrieves candidate code snippets (e.g., a function named "setup_infrastructure( )) and uses an LLM to determine that the function performs IAM role creation via an API client invocation, thereby explaining a CreateRole event even when name similarity between the function name and the alert identifier is low.

For example, a function named "initialize_infra structure( ) that invokes an IAM client to execute an API call corresponding to CreateRole would be determined to explain the CreateRole event despite lacking lexical similarity to the alert identifier. In another example, even when a function name such as "setup_permissions( ) does not include the term "CreateRole," the system determines that the function explains the CreateRole event when the function includes an API invocation corresponding to an IAM role-creation operation reflected in the cloud alert. In another example, when the cloud alert reflects an IAM CreateRole operation followed by a policy attachment, and a retrieved code excerpt includes API calls that implement the same sequence of operations, the system determines that the code excerpt explains the cloud alert even if the function name does not contain the term "CreateRole."

At S350, candidate match records are identified based on the fuzzy search. In some embodiments, the fuzzy-correlation engine 145 is configured to generate one or more candidate match records based on fuzzy-search results. Each candidate match record includes a matched code object identifier, repository reference, matching fuzzy form, similarity score, and contextual metadata.

For example, in response to retrieving search results, the fuzzy-correlation engine 145 generates candidate match records corresponding to an IaC resource definition "aws_iam_role.admin_role," a Terraform module named "admin_role_module," and a deployment manifest referencing "AdminRoleBinding." Each candidate match record includes the repository identifier, file path, matching fuzzy form, similarity score, and associated alert metadata.

At S360, the candidate match records are evaluated based on the current search hypothesis. In some embodiments, the fuzzy-correlation engine 145 is configured to evaluate whether at least one candidate match record satisfies a similarity threshold, contextual-alignment threshold, relevance threshold, behavioral-alignment threshold, a combination thereof and the like. If no candidate match record satisfies the threshold, the fuzzy-correlation engine 145 is configured to identify a failure condition and revises the hypothesis. Revising the hypothesis includes stripping environment tags or region suffixes, substituting semantically related tokens, relaxing edit-distance parameters, switching substrates, selecting a workload-extracted deployed-code substrate associated with the alerting workload when repository-based searches fail or when repository connectivity is unavailable, broadening search scope, narrowing search scope using stable artifacts, prioritizing different artifact types, a combination thereof and the like.

For example, when an initial fuzzy search using a role name "Admin-Prod-US" yields no candidate match record exceeding a similarity threshold, the system autonomously generates a revised hypothesis by stripping suffixes to search for "Admin," and evaluates whether returned candidates exhibit contextual alignment based on stable artifacts extracted from the cloud alert. If the revised hypothesis fails within repository-based substrates, the system generates a subsequent hypothesis that switches to a workload-extracted deployed-code substrate obtained from an agentless scan of the alerting workload and searches the extracted artifacts for code paths that can produce the observed role-creation sequence.

At S370, a termination condition is evaluated based on the evaluated candidate match records. In some embodiments, the fuzzy-correlation engine 145 is configured to determine whether the termination condition is satisfied. Termination conditions include: (i) identifying a candidate match record exceeding a configured threshold; (ii) reaching a maximum number of iterations; (iii) exhausting a set of candidate transformations; or (iv) determining that additional iterations are unlikely to improve alignment. If no termination condition is satisfied, the method returns to S330. If a termination condition is satisfied, the method proceeds to S380.

For example, when a candidate match record exceeds a configured similarity threshold and also satisfies a contextual-alignment constraint based on stable artifacts (such as matching policy names and resource ARNs), the system determines that a termination condition is satisfied and proceeds to finalize correlation. In another example, when no candidate match record exceeds a similarity threshold after exhausting a predetermined set of hypothesis-generation operators, the system terminates the iterative loop and proceeds to final scoring using the highest-ranking candidate match records obtained.

At S380, a correlation-confidence score is generated based on the evaluated match records. In some embodiments, the fuzzy-correlation engine 145 is configured to select, generate, a combination thereof and the like, a final hypothesis and one or more final candidate match records, and generates a final correlation record for the cloud alert. In some embodiments, the final correlation record includes the selected hypothesis, the selected search substrate, matched code-object identifiers, similarity scores, relevance scores, uniqueness metrics, behavioral-alignment scores, and a trace of attempted hypotheses and intermediate outcomes for auditability. The fuzzy-correlation engine 145 is configured to compute, based on the final candidate match records, a correlation-confidence score representing a probability that the cloud alert originates from internally maintained code. In some embodiments, the correlation-confidence score is computed using a weighted scoring function that combines at least: (i) identifier-based similarity scores; (ii) relevance scores weighted by repository context and artifact type; (iii) uniqueness metrics that down-weight generic terms; and (iv) a behavioral-alignment score indicating whether an execution path in the candidate code object explains an event-sequence representation extracted from the cloud alert. Based on the correlation-confidence score and one or more predetermined thresholds, the fuzzy-correlation engine 145 is configured to classify the cloud alert as originating from internal code, originating from external code, or inconclusive.

For example, the fuzzy-correlation engine 145 is configured to select a final hypothesis corresponding to a Terraform module defining the role "admin_role" and computes a correlation-confidence score by combining a similarity score of 0.91, a uniqueness metric indicating that the identifier is rare within the indexed corpus, and a behavioral-alignment score indicating that an execution path in a deployment script produces the event sequence reflected in the cloud alert. The fuzzy-correlation engine 145 is configured to classify the cloud alert as originating from internal code when the correlation-confidence score exceeds a predetermined threshold.

At S390, a remediation action is initiated. In some embodiments, the remediation action is based on the correlation-confidence score, at least one evaluated match record, a combination thereof and the like. In response to classifying the cloud alert as originating from internal code, the system suppresses, removes, a combination thereof and the like, the cloud alert from an active alert queue and stores the final correlation record in the alert repository for traceability and model refinement. In response to classifying the cloud alert as originating from external code, the system initiates a mitigation action via a cloud management interface, SOAR system, a combination thereof and the like, wherein the mitigation action is selected based on the cloud alert and the correlation-confidence score. In response to classifying the cloud alert as inconclusive, the system requests manual review or performs additional enrichment and stores an inconclusive correlation record.

For example, in response to classifying a cloud alert as originating from internal code, the system suppresses the cloud alert from an active alert queue, stores a correlation record including matched code-object identifiers and confidence values in the alert repository 144, and optionally updates model parameters or threshold values using the stored outcome. In response to classifying the cloud alert as originating from external code, the system initiates a mitigation workflow via a cloud management interface 152 or a SOAR system, including disabling credentials, isolating a workload, or generating an incident ticket, and records the mitigation action for auditability. In response to classifying the cloud alert as inconclusive, the system escalates the cloud alert for manual review and/or performs additional enrichment before storing an inconclusive correlation record.

The systems and methods described in this disclosure reduce noise in cybersecurity alert streams by receiving cloud alerts, preprocessing the cloud alerts, correlating cloud alerts to code objects, generating confidence scores based, in part, on the correlation and filtering alerts that originate from expected or internally defined operations. By identifying alerts that correspond to code entities maintained within the organization's code repositories (or otherwise trusted code repositories), the system distinguishes security threats from benign activity resulting from authorized code deployments, automated infrastructure updates, or routine configuration changes. As a result, alerts exhibiting high correlation confidence are suppressed or removed from further monitoring, thereby reducing false positives. Conversely, alerts exhibiting low correlation confidence are retained and subjected to mitigation workflows. This selective filtering reduces analyst workload, prioritizes investigation of anomalous events, enhances the overall signal-to-noise ratio within the cybersecurity monitoring environment.

Figure 4:
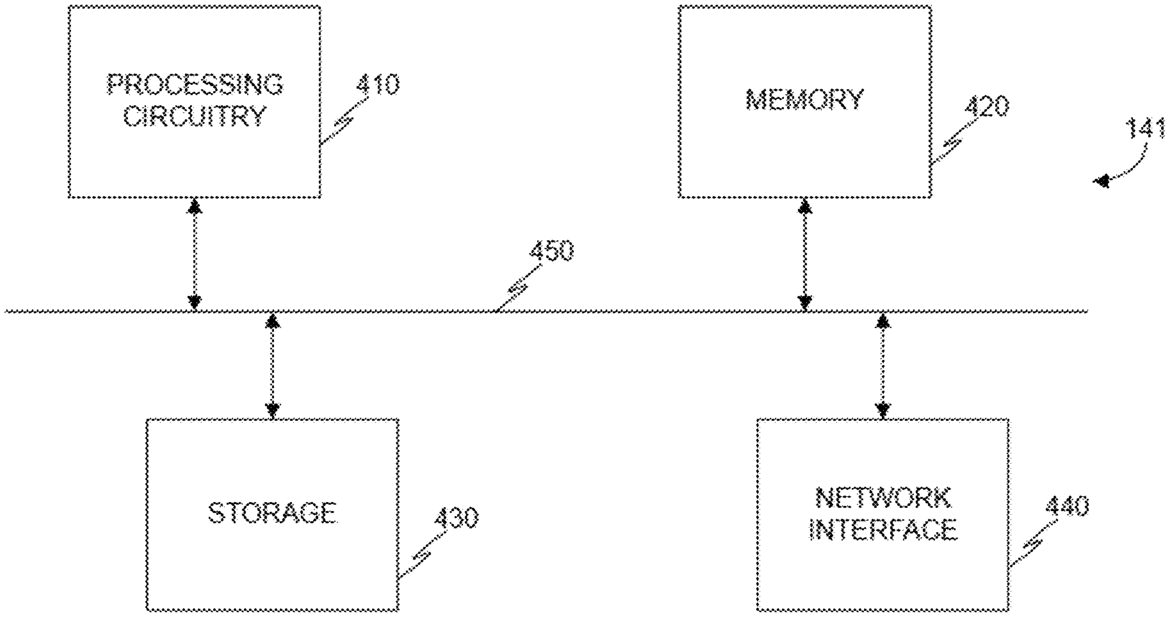
FIG. 4 is an example schematic diagram of an inspection controller according to an embodiment.

FIG. 4 is an example schematic diagram of an inspection controller 141 according to an embodiment. The inspection controller 141 includes, according to an embodiment, a processing circuitry 410 coupled to a memory 420, a storage 430, and a network interface 440. In an embodiment, the components of the inspection controller 141 are communicatively connected via a bus 450.

In some embodiments, the processing circuitry 410 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read only memory, flash memory, etc.), a combination thereof, and the like. In some embodiments, the memory 420 is an on-chip memory, an off-chip memory, a combination thereof, and the like. In some embodiments, the memory 420 is a scratch-pad memory for the processing circuitry 410.

In one configuration, software for implementing one or more embodiments disclosed herein is stored in the storage 430, in the memory 420, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 440 is configured to provide the inspection controller 141 with communication with, for example, the tenant environment 150, the source repository 130, inspection environment 140, and the like, according to an embodiment.

It should be understood that the embodiments described herein are not limited to the specific architecture illustrated in FIG. 4, and other architectures may be equally used without departing from the scope of the disclosed embodiments.

Furthermore, in certain embodiments the inspector 142, inspection controller 141, a combination thereof, and the like, may be implemented with the architecture illustrated in FIG. 4. In other embodiments, other architectures may be equally used without departing from the scope of the disclosed embodiments.

In some embodiments, the LLM inference module 149 is executed by processing circuitry 410, including by invoking a local model, a hosted model via a secured API, or an accelerator-backed inference runtime. In embodiments that utilize language models, the LLM inference module 149, otherwise perform operations that may require or be enhanced through the use of parallel processing, a combination thereof and the like, the processing circuitry 410 may include processors such as CPUs, GPUs, TPUs, or other specialized accelerators capable of supporting large-scale model inference and training. The hardware resources may be deployed on-premises, in a cloud-computing environment, or in a hybrid configuration, and may include memory, storage, and networking components sufficient to support parallel execution, load balancing, and scalable processing of genAI workloads.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for noise reduction for cybersecurity alerts in a cloud computing environment, comprising:

receiving a plurality of cloud alerts, wherein each cloud alert in the plurality of cloud alerts includes an identifier of a cloud entity;

initiating a fuzzy search based on the identifier of the cloud entity and a plurality of code objects stored in a code repository of the cloud computing environment;

determining, based on a result of the fuzzy search, a probability that a code object of the plurality of code objects is associated with the cloud alert;

removing the cloud alert from the cybersecurity monitoring system in response to determining that the probability exceeds a first predetermined threshold; and initiating a mitigation action in the cloud computing environment based on the cloud alert in response to determining that the probability is below a second predetermined threshold.

2. The method of claim 1, further comprising:

extracting alert terms from the plurality of cloud alerts; and normalizing the alert terms, wherein normalizing the alert includes tokenizing the identifier of the cloud entity.

3. The method of claim 2, further comprising:

generating a frequency-based analysis to determine a uniqueness score for each normalized alert term.

4. The method of claim 3, further comprising:

adjusting a weight of the alert term based on the uniqueness score of the normalized alert term.

5. The method of claim 1, further comprising:

training a generative AI model based on a training corpus, a training function and a selected loss function to generate a trained artificial neural network (ANN), wherein training function includes a backpropagation algorithm and a gradient descent algorithm;

inputting the identifier of the cloud entity into the trained generative AI model;

receiving fuzzy search terms from the trained generative AI model based on the input; and performing the fuzzy search based on the fuzzy search terms.

6. The method of claim 1, further comprising:

identifying fuzzy search terms based on an approximate-string-matching; and performing the fuzzy search based on the identified fuzzy search terms.

7. The method of claim 1, further comprising:

updating the first predetermined threshold based on the mitigation action; and prioritizing the mitigation action based on the probability.

8. The method of claim 1, further comprising:

recalculating the probability in response to determining the probability is between the first predetermined threshold and second predetermined threshold, wherein the first predetermined threshold and the second predetermined threshold are different numerical values.

9. The method of claim 1, further comprising:

retrieving one or more candidate code excerpts associated with a code object from the plurality of code objects;

inputting, to a large language model (LLM) model, the one or more candidate code excerpts; and generating, via the LLM, an explanatory-alignment score, wherein the explanatory-alignment score is a degree of consistency between the cloud alert and operations included in the one or more candidate code excerpts.

10. A non-transitory computer-readable medium storing a set of instructions for noise reduction for cybersecurity alerts in a cloud computing environment, the set of instructions comprising:

one or more instructions that, when executed by one or more processing circuitries of a device, cause the device to:

receive a plurality of cloud alerts, wherein each cloud alert in the plurality of cloud alerts includes an identifier of a cloud entity;

initiate a fuzzy search based on the identifier of the cloud entity and a plurality of code objects stored in a code repository of the cloud computing environment;

determine, based on a result of the fuzzy search, a probability that a code object of the plurality of code objects is associated with the cloud alert;

remove the cloud alert from the cybersecurity monitoring system in response to determining that the probability exceeds a first predetermined threshold; and initiate a mitigation action in the cloud computing environment based on the cloud alert in response to determining that the probability is below a second predetermined threshold.

11. A system for noise reduction for cybersecurity alerts in a cloud computing environment comprising:

a processing circuitry;

a memory, the memory containing instructions that, when executed by the processing circuitry, configure the system to:

receive a plurality of cloud alerts, wherein each cloud alert in the plurality of cloud alerts includes an identifier of a cloud entity;

initiate a fuzzy search based on the identifier of the cloud entity and a plurality of code objects stored in a code repository of the cloud computing environment;

determine, based on a result of the fuzzy search, a probability that a code object of the plurality of code objects is associated with the cloud alert;

remove the cloud alert from the cybersecurity monitoring system in response to determining that the probability exceeds a first predetermined threshold; and initiate a mitigation action in the cloud computing environment based on the cloud alert in response to determining that the probability is below a second predetermined threshold.

12. The system of claim 11, wherein the memory contains further instructions which when executed by the processing circuitry further configure the system to:

extract alert terms from the plurality of cloud alerts; and normalize the alert terms, wherein normalizing the alert includes tokenizing the identifier of the cloud entity.

13. The system of claim 12, wherein the memory contains further instructions which when executed by the processing circuitry further configure the system to:

generate a frequency-based analysis to determine a uniqueness score for each normalized alert term.

14. The system of claim 13, wherein the memory contains further instructions which when executed by the processing circuitry further configure the system to:

adjust a weight of the alert term based on the uniqueness score of the normalized alert term.

15. The system of claim 11, wherein the memory contains further instructions which when executed by the processing circuitry further configure the system to:

train a generative AI model based on a training corpus, a training function and a selected loss function to generate a trained artificial neural network (ANN), wherein training function includes a backpropagation algorithm and a gradient descent algorithm;

input the identifier of the cloud entity into the trained generative AI model;

receive fuzzy search terms from the trained generative AI model based on the input; and perform the fuzzy search based on the fuzzy search terms.

16. The system of claim 11, wherein the memory contains further instructions which when executed by the processing circuitry further configure the system to:

identify fuzzy search terms based on an approximate-string-matching; and perform the fuzzy search based on the identified fuzzy search terms.

17. The system of claim 11, wherein the memory contains further instructions which when executed by the processing circuitry further configure the system to:

update the first predetermined threshold based on the mitigation action; and prioritize the mitigation action based on the probability.

18. The system of claim 11, wherein the memory contains further instructions which when executed by the processing circuitry further configure the system to:

recalculate the probability in response to determining the probability is between the first predetermined threshold and second predetermined threshold, wherein the first predetermined threshold and the second predetermined threshold are different numerical values.

19. The system of claim 11, wherein the memory contains further instructions which when executed by the processing circuitry further configure the system to:

retrieve one or more candidate code excerpts associated with a code object from the plurality of code objects;

input, to a large language model (LLM) model, the one or more candidate code excerpts; and generate, via the LLM, an explanatory-alignment score, wherein the explanatory-alignment score is a degree of consistency between the cloud alert and operations included in the one or more candidate code excerpts.

* * * * *